(12) United States Patent
Ponomarev et al.

(10) Patent No.: US 12,553,849 B2
(45) Date of Patent: Feb. 17, 2026

(54) SYSTEM AND METHOD FOR DETERMINING A PROPERTY OF AN ANALYTE

(71) Applicant: Analog Devices International Unlimited Company, Limerick (IE)

(72) Inventors: Youri Victorovitch Ponomarev, Rotselaar (BE); Helen Berney, Pennywell (IE); Junfei Xia, Andover, MA (US)

(73) Assignee: Analog Devices International Unlimited Company, Limerick (IE)

( * ) Notice: Subject to any disclaimer, the term of this patent is extended or adjusted under 35 U.S.C. 154(b) by 239 days.

(21) Appl. No.: 18/312,071

(22) Filed: May 4, 2023

(65) Prior Publication Data

US 2024/0369510 A1 Nov. 7, 2024

(51) Int. Cl.
*G01N 27/327* (2006.01)

(52) U.S. Cl.
CPC .............................. *G01N 27/3275* (2013.01)

(58) Field of Classification Search
CPC ............ G01N 27/3275; G01N 33/543; G01N 33/54333; G01N 33/5438
See application file for complete search history.

(56) References Cited

U.S. PATENT DOCUMENTS

| | | | |
|---|---|---|---|
| 7,470,533 B2 | 12/2008 | Xu et al. | |
| 9,816,988 B1 | 11/2017 | Paik et al. | |
| 10,444,179 B2 | 10/2019 | Paik et al. | |
| 11,041,194 B2 | 6/2021 | Clarke et al. | |
| 11,065,615 B2 | 7/2021 | Glezer et al. | |
| 2004/0038426 A1 | 2/2004 | Manalis | |
| 2005/0026202 A1 | 2/2005 | Edman et al. | |
| 2005/0191687 A1 | 9/2005 | Wang et al. | |
| 2008/0035180 A1 | 2/2008 | Mutharasan et al. | |
| 2008/0092649 A1 | 4/2008 | Chen et al. | |
| 2011/0031123 A1 | 2/2011 | Schulze et al. | |
| 2011/0036719 A1 | 2/2011 | Neyts et al. | |
| 2012/0142016 A1 | 6/2012 | Ronaghi et al. | |
| 2013/0270521 A1 | 10/2013 | Peng et al. | |
| 2015/0377830 A1 | 12/2015 | Baldauf et al. | |
| 2017/0226037 A1 | 8/2017 | Johnson et al. | |
| 2017/0356904 A1 | 12/2017 | Paik et al. | |

(Continued)

FOREIGN PATENT DOCUMENTS

| | | |
|---|---|---|
| CN | 111051885 A | 4/2020 |
| EP | 2196796 A1 | 6/2010 |

(Continued)

OTHER PUBLICATIONS

Rich et al., Chapter 1. The revolution of real-time label-free biosensor application, in Label-free Technologies for Drug Discovery edited by Matthew Cooper and Lorenz M. Mayer, 2011, John Wiley & Sons, ISBN: 978-0-470-74683-7 (Year: 2011).*

(Continued)

*Primary Examiner* — Luan V Van
*Assistant Examiner* — Shizhi Qian
(74) *Attorney, Agent, or Firm* — ArentFox Schiff LLP

(57) ABSTRACT

Methods and systems for determining a property of an analyte in a sample, wherein a field is applied to a sensing surface to cause an analyte to debind from a surface, and subsequently the field is modified or removed to allow the analyte to rebind.

10 Claims, 9 Drawing Sheets

(56) References Cited

U.S. PATENT DOCUMENTS

| | | | |
|---|---|---|---|
| 2019/0017954 | A1 | 1/2019 | Shin et al. |
| 2019/0391142 | A1 | 12/2019 | Jeon et al. |
| 2020/0200743 | A1 | 6/2020 | Paik et al. |
| 2020/0271604 | A1 | 8/2020 | Mohanty |
| 2020/0326297 | A1 | 10/2020 | Paik et al. |
| 2021/0114025 | A1* | 4/2021 | De Freitas Dias .......................... G01N 33/54386 |
| 2022/0196596 | A1* | 6/2022 | Swett ...................... B03C 5/026 |
| 2022/0252542 | A1* | 8/2022 | Merriman ........ G01N 27/44704 |
| 2023/0097591 | A1 | 3/2023 | Doris et al. |

FOREIGN PATENT DOCUMENTS

| | | |
|---|---|---|
| EP | 2488866 B1 | 4/2015 |
| JP | 2006-322878 A | 11/2006 |
| WO | 2009/035647 A1 | 3/2009 |
| WO | 2009/155423 A1 | 12/2009 |
| WO | 2013/192178 A1 | 12/2013 |
| WO | 2015/196148 A1 | 12/2015 |
| WO | 2018/078967 A1 | 5/2018 |
| WO | 2020/176793 A1 | 9/2020 |
| WO | 2022/232506 A1 | 11/2022 |

OTHER PUBLICATIONS

Biorad, Protein interaction analysis, 2013. (Year: 2013).*
Lu et al., Plasmonic-Based Electrochemical Impedance Spectroscopy: Application to Molecular Binding, Analytical Chemistry, 2012, 84, 327-333 (Year: 2012).*
Polonschii et al., Complementarity of EIS and SPR to Reveal Specific and Nonspecific Binding When Interrogating a Model Bioaffinity Sensor; Perspective Offered by Plasmonic Based EIS, Analytical Chemistry, 2014, 86, 8553-8562 (Year: 2014).*
Extended European Search Report and Search Opinion received for European Application No. 24174230.3, mailed on Oct. 21, 2024, 10 pages.
Gomes et al., "The increasing dynamic, functional complexity of bio-interface materials", Nature Reviews Chemistry, vol. 2, No. 3, Article No. 0120, XP093206692, Mar. 7, 2018, 15 pages.
Extended European Search Report and Search Opinion received for European Application No. 241174227.9, mailed on Oct. 16, 2024, 10 pages.
Extended European Search Report and Search Opinion received for European Application No. 24174226.1, mailed on Sep. 26, 2024, 8 pages.
Extended European Search Report and Search Opinion received for European Patent Application No. 24174228.7, mailed on Sep. 16, 2024, 8 pages.
Extended European Search Report and Search Opinion received for European Patent Application No. 24174229.5, mailed on Oct. 29, 2024, 10 pages.
Non-Final office action received for U.S. Appl. No. 18/312,113, mailed on Jun. 10, 2025, 19 pages.
Sullivan et al., "A simulation and experimental study of electrochemical pH control at gold interdigitated electrode arrays", Electrochimica Acta, Article 139113, vol. 395, 2021, pp. 1-29.
Chatterjee et al., "Direct kinetic fingerprinting and digital counting of single protein molecules", PNAS research article applied biological sciences, vol. 117, Issue 37, Aug. 21, 2020, pp. 22815-22822.
Deamer et al., "Three decades of nanopore sequencing", Nature biotechnology, vol. 34, Issue 5, 2016, pp. 1-18.
Fologea et al., "Slowing DNA Translocation in a Solid State Nanopore", National Library of Medicine, vol. 5, Issue 9, Aug. 9, 2005, 15 pages.
Fujimoto et al., "Effects of Different Cations on the Hydrodynamic Radius of DNA", Biophysical Journal, vol. 67, Jul. 1994, pp. 304-308.
Hamidabad et al., "Translocation through a narrow pore under a pulling force", Scientific Reports natureresearch, vol. 9, Article No. 17885, 2019, 12 pages.
Keyser et al., "Direct force measurements on DNA in a solid-state nanopore", Nature Physics, Nature Publishing Group, London, GB, vol. 2, Issue 7, XP002528061, ISSN 1745-2473, Jul. 2006, pp. 473-477.
Kiaee et al., "A pH-Mediated Electronic Wound Dressing for Controlled Drug Delivery", Advanced Healthcare Materials, vol. 7, Issue 18, Sep. 19, 2018, 25 pages.
Laureyn et al., "Microelectronics-Based Biosensors for the Detection of Proteins and Nucleic Acids", Sensors for Environment, Health and Security, 2009, pp. 319-320.
Lee et al., "Implementation of force differentiation in the immunoassay", Analytical Biochemistry, vol. 287, 2000, pp. 261-271.
Mahmoodi et al., "Single-step label-free nanowell immunoassay accurately quantifies serum stress hormones within minutes", Science Advances, vol. 7, Issue 27, Jun. 30, 2012, pp. 1-9.
Modarres et al., "Phase-controlled convective field-effect micromixing using AC electroosmosis", Microsystems & Nanoengineering, vol. 6, Issue 60, 2020, pp. 1-11.
Monteiro et al., "Measuring local pH in electrochemistry", ScienceDirect current opinion in Electrochemistry, vol. 25, 100649, Feb. 2021, pp. 1-9.
Nikitin et al., "Magnetic Nanoparticles as a Tool for Remote DNA Manipulations at a Single-Molecule Level", ACS Applied Materials & Interfaces 2021, vol. 13, Issue 12, Mar. 19, 2021, pp. S1-S17.
Pande et al., "Electrochemically Induced pH Change: Time-Resolved Confocal Fluorescence Microscopy Measurements and Comparison with Numerical Model", The journal of Physical Chemistry Letters, vol. 11, 2020, pp. 7042-7048.
Purcell E.M., "Life at low Reynolds number", World Scientific Publishing Co. Pte Ltd., 1977, 2 pages.
Sadeghian et al., "Interdigitated electrode design and optimization for dielectrophoresis cell separation actuators", Science Direct Journal of Electrostatics, vol. 86, Apr. 2017, 7 pages.
Sevenler et al., "Beating the reaction limits of biosensor sensitivity with dynamic tracking of single binding events", PNAS research article engineering, vol. 116, Issue 10, Feb. 19, 2019, pp. 4129-4134.
Strunz et al., "Dynamic Force Spectroscopy of Single DNA Molecules", PNAS research article biophysics and computational biology, vol. 96, Sep. 28, 1999, pp. 11277-11282.
Tropini et al., "Multi-nanopore force spectroscopy for DNA analysis", Biophysical Journal, vol. 92, Issue 5, Mar. 2007, pp. 1632-1637.
Walter Minnella, "pH control in microfluidics: a short review Introduction to pH control in microfluidics", Microfluidic Reviews, Mar. 22, 2023, pp. 1-5.
Ying et al., "Nanopore-based technologies beyond DNA sequencing", Nature Nanotechnology, vol. 17, 2022, pp. 1136-1146.
Zeng et al., "Dynamic single-molecule sensing by actively tuning binding kinetics for ultrasensitive biomarker detection", PNAS, vol. 119, Issue 10, e2120379119, 2022, pp. 1-7.

* cited by examiner

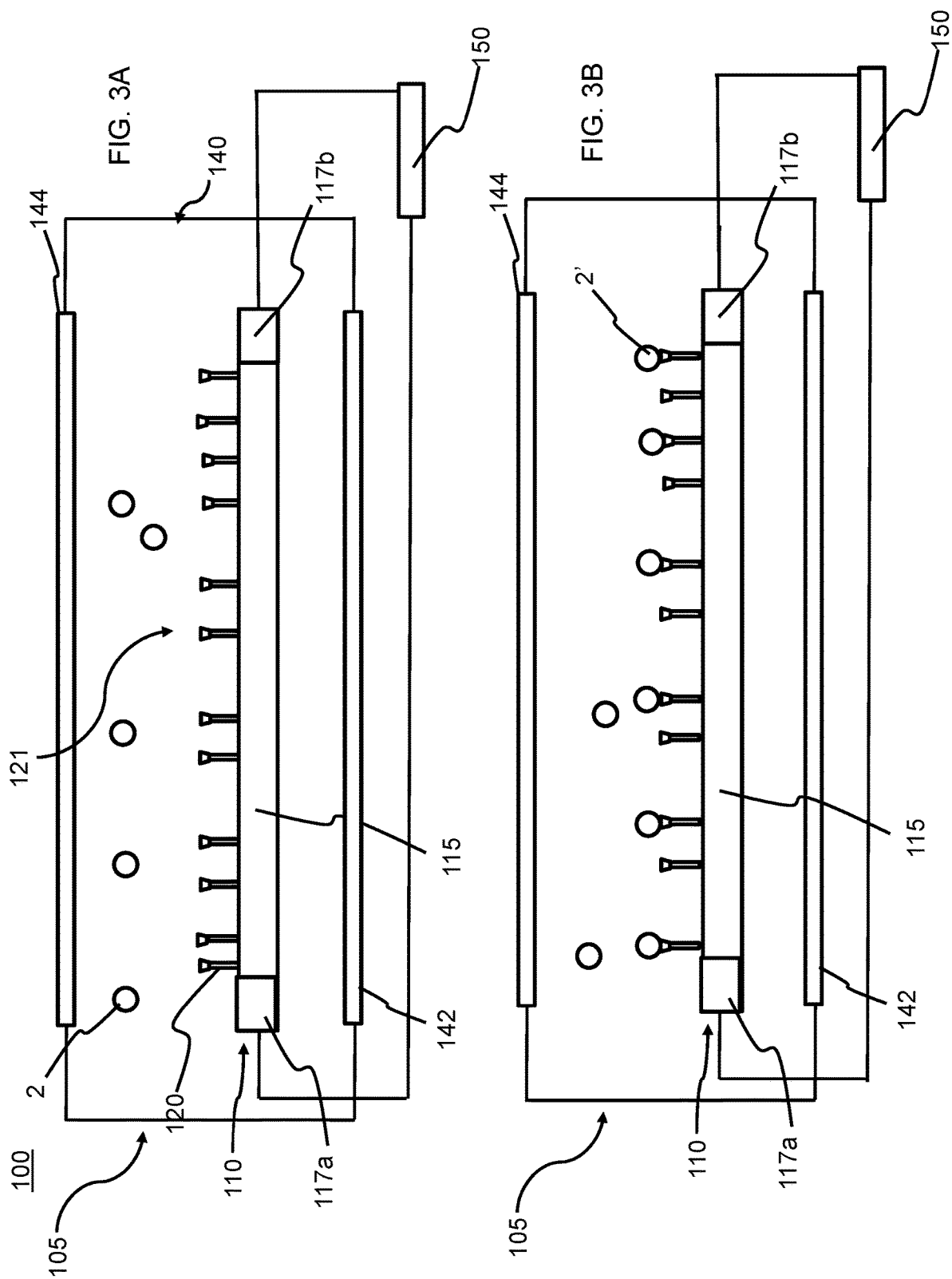

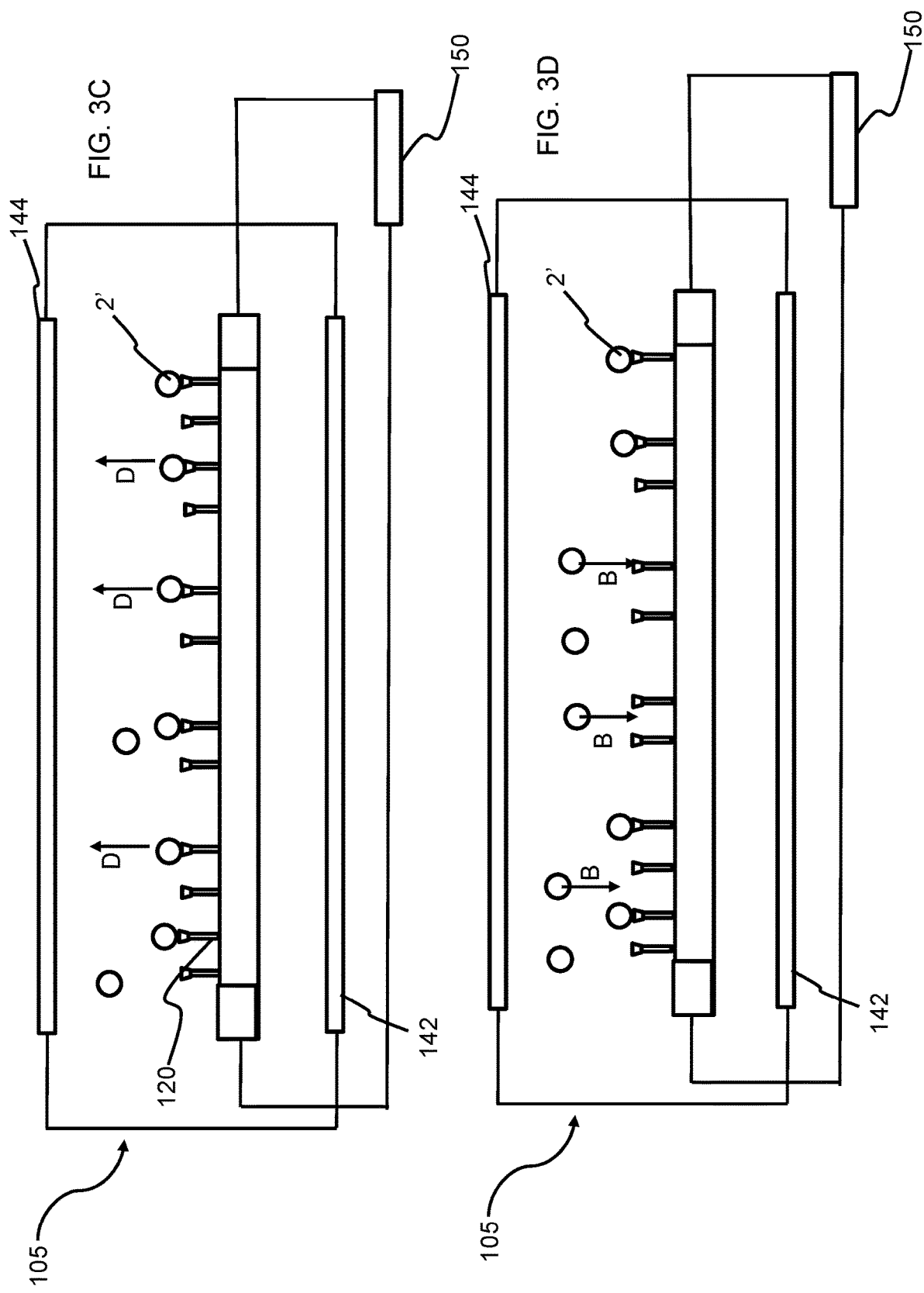

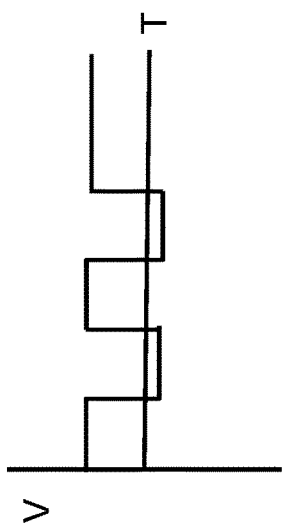
FIG. 6A
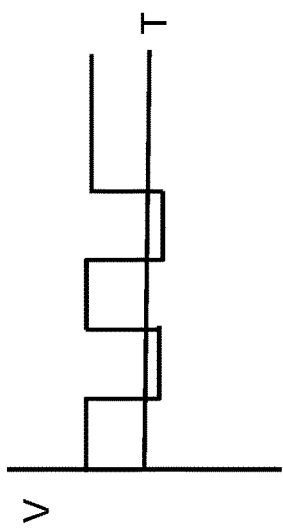
FIG. 6B
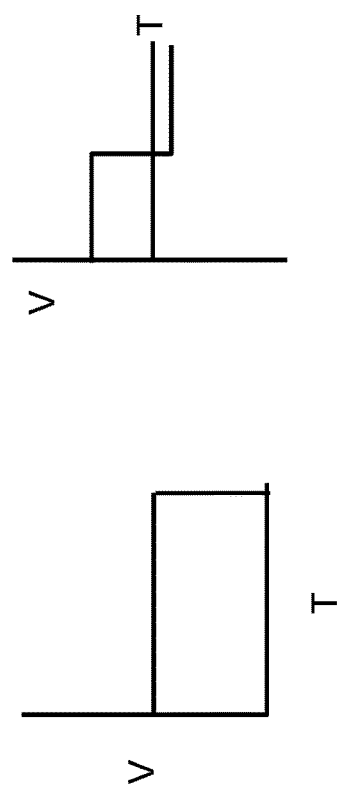
FIG. 6C
FIG. 6D
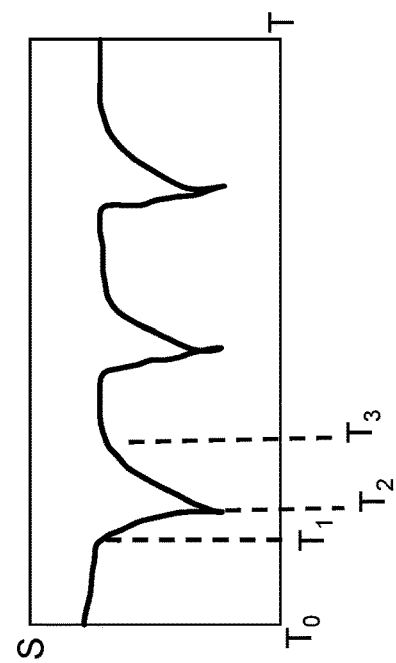
FIG. 7

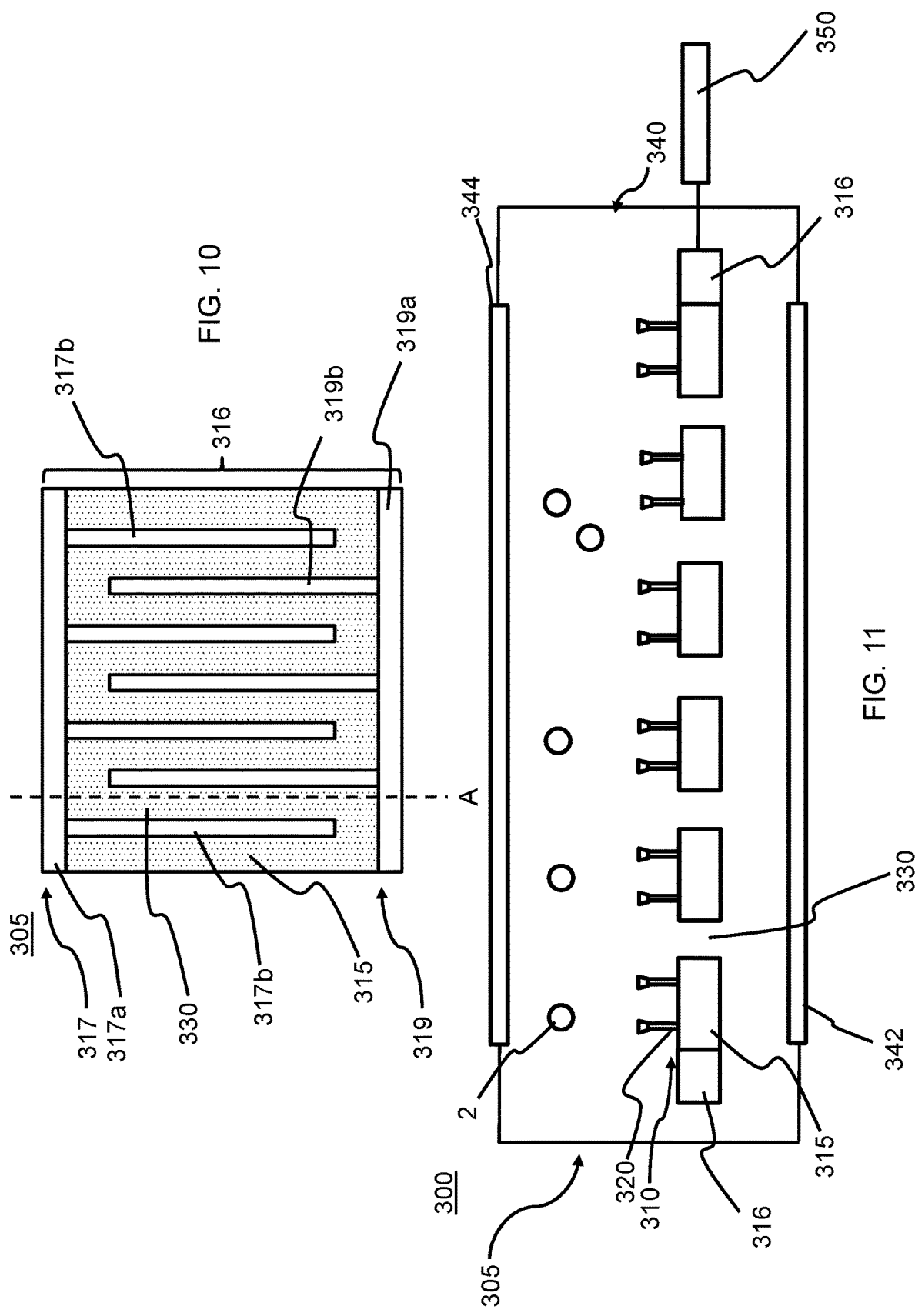

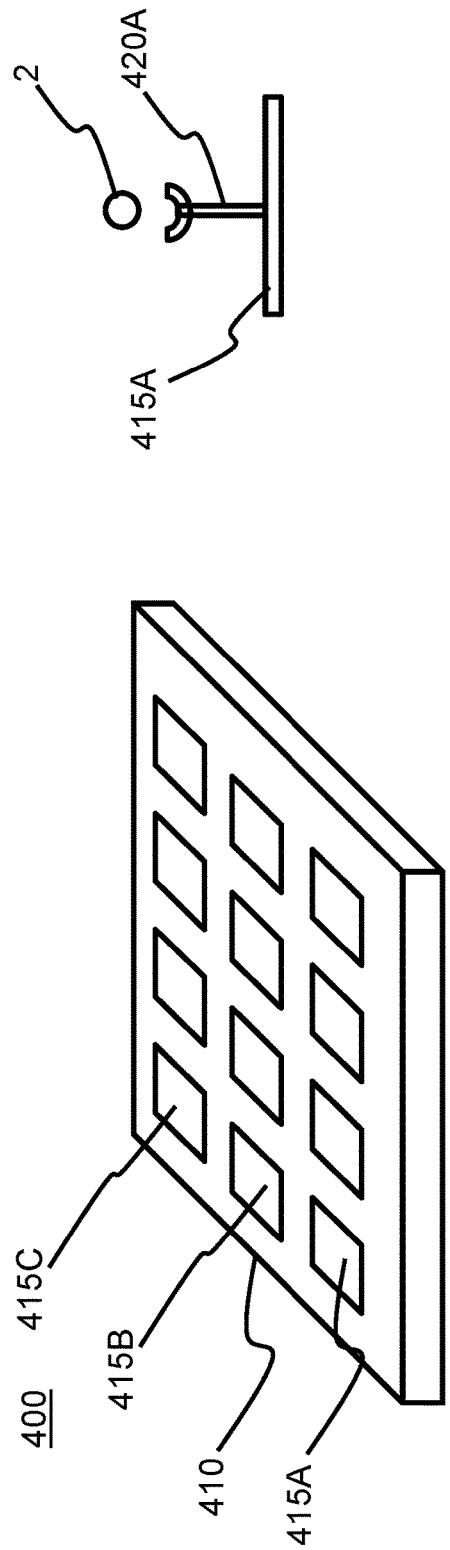
FIG. 12A
FIG. 12B
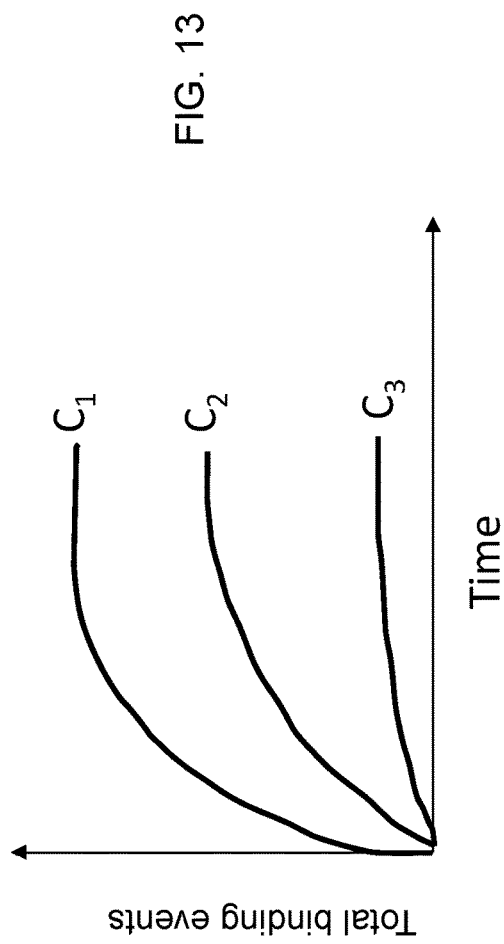
FIG. 13

SYSTEM AND METHOD FOR DETERMINING A PROPERTY OF AN ANALYTE

FIELD OF THE DISCLOSURE

This disclosure relates to methods and systems for determining a property of an analyte in a sample, such as in a biological or chemical assay.

BACKGROUND

Various biological and chemical assay are known for sensing analytes. Analytes may, for example, include biomarkers, such as hormones, established to assist in patient monitoring and/or diagnosis.

Many of these assays are now carried out using electrical sensors, such as electrochemical sensors. For example, some traditional sensors in these fields use sensing elements with an immobilized capture species provided thereon. These are typically provided on the surfaces of the sensing elements through covalent chemical linkage, covalent-like interactions (e.g. chemisorption of anchor species onto the surface through chemical bond formation) and non-covalent-like interactions (e.g. physisorption of anchor species onto the surface through weaker, often van der Waals, interactions) depending on the identity of the surface and the anchor species. These species are used to capture target analytes, with the binding of analytes causing a change in a measured output (e.g. current).

Although rapid improvements in the selectivity and sensitivity of these sensors have been made over the past decades, there is still a need to improve these, particularly for biological sensing systems. For example, there is a desire to increase the accuracy of the detection of a particular analyte and the time to determine a result. It can also be difficult to differentiate between different biomolecules (such as proteins, DNA, RNA, antibodies) where there are only minor changes, such as mutations.

Moreover, many existing assays require the binding of analyte to capture species to reach equilibrium. This often requires incubation times of 30 minutes or more, limiting uses and restricting point-of-care options.

SUMMARY OF THE DISCLOSURE

The present disclosure provides methods and systems for determining a property of an analyte in a sample, wherein a field is applied to a sensing surface to cause an analyte to debind from a surface, and subsequently the field is modified or removed to allow the analyte to rebind.

In a first aspect, there is provided a method for determining a property of an analyte in a sample, the method comprising: providing a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; providing the sample to the sensing surface, wherein at least a portion of analyte specifically bind to capture species to form a specifically-bound analyte species; applying a field to the sensing surface in a debinding step, the field being configured to apply a force to cause at least a portion of the specifically-bound analyte species to debind from the capture species; obtaining the measurement signal at least before and during the debinding step; removing or modifying the field so as to allow at least a portion of analyte specifically bind to capture species to form a specifically-bound analyte species in a binding step; obtaining the measurement signal during and/or after the binding step; and determining the property of the analyte in the sample based on the measurement signal before and during the debinding step and during and/or after the binding step.

In a second aspect, there is provided a system for determining a property of an analyte in a sample, the system comprising: a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; a field application unit configured to apply a field to the sensing surface so as to apply a force to the sample adjacent the sensing surface so as to cause at least a portion of specifically-bound analyte species to debind from the capture species; a control unit configured to operate the field application unit; and a property determination unit configured to determine the property of the analyte, wherein the control unit is configured to: operate the field application unit so as to apply a force to the sample and cause specifically-bound analyte species to debind from the capture species in a debinding step; and operate the field application unit so as to remove or modify the field so as to allow at least a portion of analyte specifically bind to capture species to form a specifically-bound analyte species in a binding step; wherein the property determination unit is configured to determining the property of the analyte in the sample based on the measurement signal before and during the debinding step and during and/or after the binding step.

BRIEF DESCRIPTION OF THE DRAWINGS

The present invention will now be described in more detail with reference to the accompanying drawings, which are not intended to be limiting:

FIGS. 3A to 3D provide schematic cross-sectional views of a part of the system of FIG. 2;

FIGS. 6A-6D provide exemplary voltage profiles for a field application unit;

FIG. 7 provides an example signal response;

FIG. 10 provides a schematic plan view of a sensor assembly according to an embodiment;

FIG. 11 provides a schematic cross-sectional view of a part of a system comprising the sensor assembly of FIG. 10;

FIG. 12A provides a schematic perspective view of a system according to an embodiment and FIG. 12B shows a cross-section through a single sensing site of the system; and FIG. 13 provides a graph depicting signal over time for the system of FIGS. 12A and 12B.

DETAILED DESCRIPTION

Figure 2:
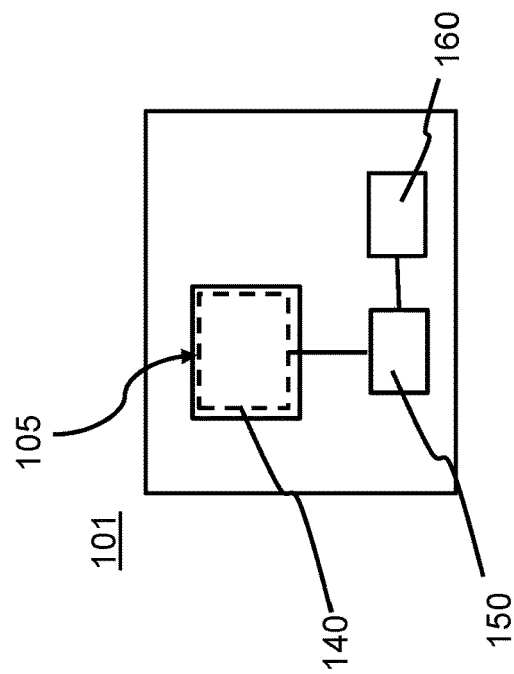
FIG. 2 provides a schematic plan view of a system according to an embodiment comprising the sensor assembly of FIG. 1.

Electrochemical sensors, including biosensors and chemisensors, are used for various biological and chemical assay are known for sensing analytes in samples. Analytes may, for example, include biomarkers, such as hormones, established to assist in patient monitoring and/or diagnosis.

Although rapid improvements in the selectivity and sensitivity of these sensors have been made over the past decades, there is still a need to improve these, particularly for biological sensing systems. For example, there is a desire to increase the accuracy of the detection of a particular analyte and the time to determine a result. It can be difficult to differentiate between different biomolecules (such as proteins, DNA, RNA, antibodies) where there are only minor changes, such as mutations. Moreover, binding in these systems can be slow. Often an incubation period is required while the assay reaches equilibrium, slowing down measurements and limiting applications (such as point-of-care testing).

In a first aspect, there is provided a method for determining a property of an analyte in a sample, the method comprising: providing a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; providing the sample to the sensing surface, wherein at least a portion of analyte specifically bind to capture species to form a specifically-bound analyte species; applying a field to the sensing surface in a debinding step, the field being configured to apply a force to cause at least a portion of the specifically-bound analyte species to debind from the capture species; obtaining the measurement signal at least before and during the debinding step; removing or modifying the field so as to allow at least a portion of analyte specifically bind to capture species to form a specifically-bound analyte species in a binding step; obtaining the measurement signal during and/or after the binding step; and determining the property of the analyte in the sample based on the measurement signal before and during the debinding step and during and/or after the binding step.

In a second aspect, there is provided a system for determining a property of an analyte in a sample, the system comprising: a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; a field application unit configured to apply a field to the sensing surface so as to apply a force to the sample adjacent the sensing surface so as to cause at least a portion of specifically-bound analyte species to debind from the capture species; a control unit configured to operate the field application unit; and a property determination unit configured to determine the property of the analyte, wherein the control unit is configured to: operate the field application unit so as to apply a force to the sample and cause specifically-bound analyte species to debind from the capture species in a debinding step; and operate the field application unit so as to remove or modify the field so as to allow at least a portion of analyte specifically bind to capture species to form a specifically-bound analyte species in a binding step; wherein the property determination unit is configured to determining the property of the analyte in the sample based on the measurement signal before and during the debinding step and during and/or after the binding step.

Embodiments provide methods and systems which have improved sensor functionality and versatility, including improved accuracy of measurement and improved speed of analysis.

The method and systems rely on using a force applied to the sample to change the interaction between the analyte and the capture species, namely between a situation where binding preferentially occurs (a binding step) and a situation in which debinding preferentially occurs (through the application of the force to the sample). Specifically, this sensor assembly includes a field application unit (or force generation device) which generates a field (e.g. an electric and/or magnetic field) which provides a force acting on the species in the sample and causes debinding in a debinding step. The field is then modified or removed to allow binding to preferentially occur again.

Causing debinding to occur and monitoring the signal, rather than the conventional practice of incubating until binding is at equilibrium and taking an end-point measurement, can provide significant additional information about the analyte. For example, this can provide information about the nature of binding between the analyte and capture species (e.g. through tracking the change in signal at particular forces) and the concentration of analyte within the sample (e.g. through dynamic tracking of the analyte (as opposed to endpoint assays). For example, by shifting to a debinding state (e.g. moving species away from the site to create lower concentration regions and/or providing a force which actively removes analyte from the sensing surface and capture species) information on the affinity between the capture species and analyte, as well as the number of interactions of capture species and analyte can be obtained. Advantageously, this can also be used to obtain more information about the analytes than a straightforward comparison to an incubation or equilibrium state. Whereas typical incubation leads to equilibrium where binding and debinding are at the same rate, this can be limited to information on the total amount bound at any one point, rather than the total amount available for binding.

This information can also be obtained more quickly than those tests requiring incubation to completely reach equilibrium, since interrogation can start once binding has started by debinding (and optionally binding) the analyte before all of the analyte in the sample to have bound to a corresponding capture species. Information includes looking at average statistics, time domain information (interaction time measurement over several seconds of measurement time), etc. which is not otherwise available.

For example, concentration changes of analyte will have an effect on the number of binding/debinding events as measured over time, whereas force (e.g. in binding and/or debinding step(s)) will have an effect on binding which is time-independent. Amongst other benefits, using binding/debinding steps allows the tuning of the binding energy of the capture species/analyte interaction to be in particular range by encouraging binding or debinding. This in turn results in a more selective signal which will be a concentration-dependent time series of binding/de-binding.

These methods and systems also provide flexibility within the same system to deal with unexpected responses. It will be appreciated that it will not always be possible to know what species with non-specifically bind with the sensing element, particularly in contaminated or complex mixtures, and by interrogating the debinding as well as the binding relationship, the analyte binding can be drawn out of the noise associated with the contaminated or complex mixtures. This is particularly important where there is a low concentration of analyte. For example, specific binding of analyte to capture species is typically the strongest interaction between a sensing surface and other species which non-specifically bind. Application of a force strong enough to overcome the specific binding will also drive away non-specifically bound components and subsequent rebinding in the binding step can thus provide a more accurate indication of the presence of the analyte (e.g. concentration).

Using a force provided by a field provides a quick and effective means of causing binding and debinding and avoids drawbacks which could occur with using physical environmental changes to drive changes in binding which could impact particular species, such as biomolecules. For example, fields can be reconfigured or modified in a straightforward manner to tailor the debinding step and the success can be monitored simply by measuring the usual response provided by the sensor assembly. This provides versatility that different chemical-based solutions could not. Moreover, the generation of a field can be carried out using electrodes and/or magnetic elements which can readily be integrated into existing sensor structures and semiconductor manufacturing techniques.

Using a force also allows for the more accurate determination of the binding energy of the sample more easily. For example, the signal response compared to the particular force applied by the field will provide information on the nature of binding.

The methods disclosed here may comprise carrying out any of the steps carried out in respect of the system disclosed herein. For example, the method may additionally comprise carrying out any of the steps the control unit, signal processing unit and/or property determination unit are configured to carry out. Similarly, the systems disclosed herein may comprise carrying out any of the steps carried out in respect of the system disclosed herein. For example, the control unit may be configured to carry out any of the steps disclosed herein, optionally in conjunction with the field application unit and/or property determination unit.

Binding and Debinding

As set out above, binding and debinding are two states: one in which the binding preferentially occurs and one in which debinding preferentially occurs, respectively.

Binding affinity defines the nature of the interaction between two entities which non-covalently bind together, in this case the respective capture species and target analyte (or a detection species and target analyte) and can be represented as the binding constant ($K_a$) or the inverse of the binding constant, the dissociation constant ($K_D$). Causing the debinding of the entity requires overcoming the force associated with $K_D$.

$K_A$ and $K_D$ are equilibrium constants relating to the rate of binding of the target analyte to the capture species (rate constant $k_{on}$) and the subsequent rate of dissociation of the target analyte from the capture species (rate constant $K_{off}$). In particular:

$$K_A = \frac{k_{on}}{k_{off}} \quad K_D = \frac{k_{off}}{k_{on}} = \frac{1}{K_A}$$

$K_D$ is in molar concentration (M or mole/L), $K_A$ is $M^{-1}$ (or L/mole), $K_{off}$ and $K_{on}$ are moles/second.

In a traditional sensing environment, the rates of $k_{on}$ and $k_{off}$ are influenced by a number of factors, including the sample environment (temperature, concentration, pH, etc.).

Applying a force using the field overcomes the binding affinity by applying a force (or energy) to the bound components. For example, the application of the field to the analyte provides a kinetic force on the analyte which removes the analyte from the capture species (or removes the capture species from the analyte). This force is greater than the binding affinity. Importantly, the application of the force can give information on $K_A/K_D$, which in turn characterises the relationship between the respective capture species and the target analyte. For example, the sensor response will indicate changes due to the application of the force, and the magnitude the force (strength/duration) may indicate the number of species debinding as a result of the application of force. Subsequent removal of the force can provide further information on this relationship.

In embodiments, binding affinity ($K_A$ and/or $K_D$), $K_{on}$ and/or $K_{off}$ can each be measured as set out in "How to measure and evaluate binding affinities" Jarmoskaitelshraq et Al. 2020 eLife 9: e57264 https://doi.org/10.7554/eLife.57264, which is incorporated herein by reference. In particular, in some embodiments, the binding affinity ($K_A$ and/or $K_D$), $K_{on}$ and/or $K_{off}$ can be measured in accordance with the "kinetic approach" method set out in Appendix 1 of "How to measure and evaluate binding affinities". In some embodiments, this can include measurements at 25° C. and/or 0° C. In some embodiments, $K_{on}$ is measured as set out in this method "$k_{on}$ chase" in Appendix 1. In some embodiments, these values (binding affinity ($K_A$ and/or $K_D$), $K_{on}$ and/or $K_{off}$) are measured across concentrations of 0.05 nM to 0.30 nM in 0.05 nM increments.

In other embodiments, binding affinity ($K_A$ and/or $K_D$), $K_{on}$ and/or $K_{off}$ can each be measured using Biolayer Interferometry (BLI), for example using ForteBio Octet RED384 instrument and, in some embodiments, the method set out in "Off-rate screening for selection of high-affinity anti-drug antibodies" Ylera et. Al Analytical Biochemistry, Vol 441, Issue 2, 2013, Pages 208-213, ISSN 0003-2697, which is incorporated herein by reference.

Debinding

As set out above, the application of the force causes the detachment of one species from the other, for example due to a kinetic force or through the application of energy. These are situations in which the force is applied directly to one of the analyte or a species bound thereto. The application of the force to the sample may also cause movement of species within the sample, whether this is the analyte or other species, through magnetic force or electrophoresis. This in turn can create concentration gradients within the sample, which in turn modify the rate of $k_{on}$ or $K_{off}$ to the extent that this causes a shift in the rate of binding ($k_{on}$) or rate of dissociation ($K_{off}$).

One of the major rate determining steps in measurement using a target analyte and a capture species is the reaction speed. The speed (rate) will depend on a number of factors, including the number (or density) of capture species, the number of already bound capture species, the size of the sensing area, and importantly, the rate of binding and dissociation (i.e. characterized by $K_A$ or $K_D$). In equilibrium, this can be written as:

$$N = b_m A \frac{f}{1+f}, f = \frac{c}{K_D}$$

where N is number of bound capture species, $b_m$ is surface density of capture species (number/cm$^2$), A is sensing area (cm$^2$) and c is concentration (M).

Many of these parameters remain constant within the system during debinding, and it is only N which is variable such that this can be interrogated. Where $K_p$ is not known, it can be derived where N is known. This information can also allow measurements to be configured so as to have a high concentration, so that $K_{off}$ is high, thereby reducing measurement time while still obtaining a quantitative concentration.

In some embodiments, the capture species has an affinity defined by $K_D$ of from $1 \times 10^{-4}$ to $1 \times 10^{-15}$ M (i.e. micromolar (μM) to femtomolar (fM)). This may be from $1 \times 10^{-7}$ to $1 \times 10^{-15}$ M or from $1 \times 10^{-4}$ to $1 \times 10^{-12}$ M (i.e. micromolar (μM) to picomolar (pM)).

Detaching the analyte from the capture species or a tag or detection element (e.g. in the debinding step) from the analyte requires a force to be applied which is sufficient to overcome the strength of the interaction between these species. This force applied will depend on the properties of the species it is acting on (e.g. net electric charge where e-field is used), and the force required to detach the relevant species will depend on the interaction between the species, such as strength of the bond. These forces are typically in the range of 10 to 400 pN, such as 30 to 400 pN, such as 30 to 300 pN. Accordingly, in embodiments, during a debinding step, the force applied to the complex comprising bound analyte is from of 10 to 400 pN.

In embodiments, the force is applied to a sample (e.g. a liquid) in a localised region within an area or boundary having a maximum distance from the sensing surface (in any direction, for example including height in a direction perpendicular to the sensing surface or distance away from in the plane of the surface) related to the length of the capture species, since it is on this scale that any modification will have an effect on the sensor response and/or binding relationship and while benefiting from only having to modify the local region. In some embodiments, the distance may be up to 20× the length of the capture species, such as up to 10×, such as from 0.1× to 20× the length of the capture species, for example, 0.1× to 10× the length. In one embodiment, the modification unit is configured to apply the force to a sample received on the sensing surface in a localised region adjacent the sensing surface, the localised region having a maximum distance from the sensing surface of 10× length of the capture species. The length of the capture species is defined by the longest length of the capture species as measured from the sensing surface. In some embodiments, the distance may be up to (i.e. less than or equal to) 100 nm, such from 1 nm to 100 nm. The distance may be a single distance, e.g. height or width, both height and width, or all distances from the sensing surface such that the modification must occur at least one point within this localised region. In this context, the sensing surface is defined as being the part of the sensing element (or sensing layer, where present) which comprises the capture species.

Binding

The method comprises removing or modifying the field so as to allow at least a portion of analyte specifically bind to capture species to form a specifically-bound analyte species in a binding step. Removing the field means removing the field applied during the debinding step and modifying the field can mean altering the field to increase binding. This could be the reversal of the direction of the field, in some embodiments, so that analyte is driven to the sensing surface using electrophoresis. Alternatively or additionally this could be a reduction in the force applied (field strength) so that the force is below that required to cause debinding (or at least significant debinding).

In one embodiment, the method further comprises allowing analyte to bind to the capture species without the application of the field to the sensing surface in an incubation step; and obtaining the measurement signal during the incubation step. In other words, no force is applied to the sample by the field during an incubation step, which can occur prior to the debinding step. The debinding methods of the method can accordingly be used in conjunction with traditional incubation steps. For example, in embodiments, the incubation step may be carried out for a period of time before the debinding step so as to allow the binding of some analyte to the capture species (and/or to a detection species). However, compared to traditional sensing methods, this incubation time can be significantly reduced while obtaining a more accurate measurement. In some embodiments, additionally or alternatively, the incubation step may be carried out after the debinding step to so as to allow (further) binding of some analyte to the capture species (and/or to a detection species).

In one embodiment, the method further comprises applying a field to the sensing surface in the binding step, the field being configured to apply a force to increase the rate of binding. In one embodiment, the control unit of the system can accordingly be further configured to operate the field application unit to apply a field to sample on the sensing surface to increase the rate of binding of analyte to the capture species in a binding step. The force can be used to facilitate binding. This can be achieved, in embodiments, by the field being configured so as to cause movement of the analyte towards the capture species. In one embodiment, the field application unit applies a directional field and wherein the control unit is configured to operate the field application unit to apply a field to sample on the sensing surface to increase the rate of binding of analyte to the capture species in the binding step by applying a field which causes the analyte to move towards the sensing surface. Such a method and system can speed up measurement time by causing movement of the species in the sample to migrate to the sensing element at a movement speed which is greater than diffusion and/or mass transport limitations. This can reduce the time of or reduce the need for an incubation period by increasing the availability of the target molecules and the probability of a binding event. This may also be used as a further filter of the sample, since different species will move at different rates and therefore may be selectively driven to (or beyond) the sensing element, also speeding up measurement time and accuracy. Alternatively or additionally, this can be achieved by using the force to remove other components from the vicinity of the sensing surface (such as non-selectively bound components) which can in turn cause migration of analyte to the sensing surface (e.g. where there is an ionic gradient) and thus increase the availability of the analyte species for binding.

In some embodiments, movement of the analyte species towards the surface comprises applying a force of less than 50 pN to the analyte, such as less than 40 pN or less than 30 pN. In embodiments, this can be from 1 pN to 50 pN, such as from 1 pN to 30 pN.

In an embodiment, the method comprises alternating plural binding steps and plural debinding steps; and the method comprises obtaining the measurement signal during the plural debinding step and binding steps. This can be a plurality of one of the binding and debinding steps or plural of each. For example, a cycle of a debinding step followed by a binding step, repeated for at least 2 cycles. In an embodiment of the system, the control unit is configured to alternate plural binding steps and plural debinding steps; and wherein the property determination unit is configured to determine the property of the analyte in the sample based on the measurement signal during the plural debinding step and binding steps. Cycling the debinding and binding steps can provide multiple data points about the nature of binding and the amount of sample, building up a fingerprint or response which is unique to the presence and amount of the target analyte. This can be used to compensate for noise and increase accuracy. For example, this be compared to expected responses, for example for different concentrations of the analyte and/or pertaining to modified analyte species (e.g. where there are minor mutations or mismatches, such as for mismatched DNA. Moreover, the response and magnitude will change as this tends towards equilibrium during points in which the force is not applied and so the response will also be specific to the nature of the specific interrogation (i.e. the way in which the steps are alternated). This can be with a static sample on the site such that there are multiple replicates of the sample on the same size or may be with flow across the sensing site. The alternating may be immediately switching between the steps, or there may be a period in between each of the steps (e.g. where no field is applied, if both steps comprise applying a field). The measurement signal may then be used to look at average statistics, time domain information (interaction time measurement over the measurement time) and other useful statistics to determine properties of the analyte. Finally, using binding and debinding can be used to distinguish non-specific binding. Without wishing to be bound by theory, it is thought that non-specific binding is less repeatable than specific binding, and thus manipulations and, particularly cycling between binding and debinding steps, will distinguish between the signal associated with non-specific binding.

The debinding step may be carried out for at least 0.1 ms, such as at least 5 ms, 10 ms, at least 50 ms or at least 100 ms. This can be 0.1 ms to 5 minutes, for example. The binding step may be carried out for 0.1 ms, such as at least 5 ms, 10 ms, at least 50 ms or at least 100 ms, at least 1 s or more. This can be 0.1 ms to 5 minutes, for example. Where the binding and debinding steps are alternated (and may further include periods between where neither binding or debinding steps occurs), this period may be 0.1 ms to 30 minutes, such as 0.1 ms to 10 mins, 0.1 ms to 5 mins, 1 ms to 5 mins or any suitable range therebetween. The incubation step, where present, may be carried out for at least 5 s, such as at least 60 s. This can be up to 30 mins, or up to 10 mins, for example.

Measurement Signal/Determining the Property

The sensing element provides a measurement signal indicative of the interaction of the capture species with the analyte and the method comprises obtaining the measurement signal at least before and during the debinding step and during and/or after the binding step. The method also comprises determining the property of the analyte in the sample based on the measurement signal (i) before and during the debinding step and also (ii) during and/or after the (subsequent) binding step. That is, the sensing element can be interrogated or addressed to provide a measurement signal indicative of the interaction between the sensing surface and the analyte, and primarily it is indicative of the interaction between capture species and the analyte. Changes in these interactions will lead to a change in the measurement signal, which can be equated to a property. Moreover, obtaining this before and during the debinding step will provide an indication of the change in signal as a result of the progression during debinding step and therefore provide the user with information on the result of the action of the force, and hence any binding (if present) between the capture species and analyte. In some embodiments, the measurement signal may be obtained for the duration of the debinding step. This can provide a fingerprint or pattern associated with the various interactions on the surface specific to a particular sample and/or analyte (and a concentration thereof), which can in embodiments be compared to a reference signal.

The method further comprises obtaining the measurement signal during and/or after the binding step; and the step of determining the property of the analyte in the sample is based on the measurement signal during and/or after the binding step. In the context of the system, in one embodiment, the property determination unit is configured to determine the property of the analyte in the sample based on the measurement signal during and/or after the binding step. Where an incubation step is present, the method and systems may comprise obtaining the measurement signal during the incubation step (and the control unit configured accordingly) and the step of determining the property of the analyte in the sample is additionally based on the measurement signal during the incubation step.

As set out above, measurement during and/or after a binding step provides information and allows for a comparison of binding vs debinding, which can provide further information and discriminate between species and types of binding. For example, in many cases the binding and debinding steps will each provide a unique response to the analyte and concentration of the analyte, and monitoring both can therefore provide further confidence in the measurement. In some embodiments, the measurement signal may be obtained for the duration of the binding step. This may be for the duration of the binding step as well as for the duration of the debinding step. Where an incubation step is used, the measurement signal may be obtained for at least a part of this.

Embodiments of the methods, where the measurement signal of the sensor is monitored during binding (e.g. during binding and/or incubation steps), and debinding can be used to directly measure capture species and analyte interactions and without needing to wait for equilibrium to be reached. This dynamic tracking of the binding and debinding can also help distinguish specific binding with non-specific binding, with debinding under the force occurring more quickly for non-specifically bound species or at a lower force.

Moreover, these can be used to provide information not obtainable through traditional assays, such as confirmation of binding affinity, for example. This can be useful for embodiments in which there may be mutations of modifications of the analyte. For example, DNA mismatch is one type of mutation which is very difficult to detect. For example, where DNA is the analyte, it may be that some of the DNA has not replicated correctly or there has been a mutation such that there is DNA mismatch. This mismatch may not be significant enough to prevent binding with the capture species, but it will impact the binding affinity between the DNA and the capture species. Accordingly, the response to the binding and debinding will therefore be different, and signal changes associated with each can provide information on the amount of each present in a sample. In the case of the application of force, it might be that the mismatched DNA species debind at an earlier point that the target DNA, resulting in an earlier change in signal. The rate of binding may also be slower. This could be used as a way to reduce errors of replication during PCR, for example.

The methods and systems can be used to determine or measure a property ("analyte property") of an analyte in a sample, such as an analyte characteristic. In certain embodiments, this can be selected from a determination of the presence of the analyte, the concentration of the analyte in the sample, the diffusion constant of the analyte (e.g. rate of diffusion measured in $m^2/s$) in the sample matrix, the binding affinity of the analyte to the capture species or a combination thereof. The terms "analyte concentration" or "concentration of the analyte" as used herein may, in certain embodiments, refer to the activity of the analyte. The activity of the analyte may provide a measure of the effective concentration of the analyte in a sample matrix.

In some embodiments, the determination of the property may be based on a parameter relating to the change in measurement signal during the switch, such as rate of change and/or magnitude. In some embodiments, the determination of the property may be based on a parameter relating to the change in measurement signal during the process of moving from to the debinding configuration by applying the force to the sample. In some embodiments, this may be during each of the binding and debinding steps, where present. For example, the determination of the property may be based on the measurement signal during the alternating (cycling) and the determination of the property, and specifically a parameter relating to the change in measurement signal during the switch, such as rate of change and/or magnitude. The rate of change can provide useful information about the kinetics and nature of the non-specific binding during the process. For example, the information over time and changes in the rate may give information about the types of species bound to the sensor element. For example, at low concentrations, the time required to reach equilibration is longer (equilibration is concentration dependent). For low dissociation rates in standard assays, the longer the incubation time required to reach equilibration. Performing binding and debinding and using the signal (1) reduces incubation time by driving association kinetics with locally increased analyte concentration and (2) increases the dissociation rate by driving the debinding, thereby increasing measurement speed. This may give rise to a specific fingerprint or pattern, providing further information on the species and in turn how to compensate or obtain an accurate reading. This fingerprint or pattern can be compared to what is expected (e.g. a predetermined fingerprint or pattern) for the analyte to determine the presence and/or concentration of the analyte. Accordingly, in some embodiments, the property determination unit is configured to determine the property of the analyte based (at least in part) on a rate of change in the measurement signal during at least one of the binding and/or debinding steps. This may be during both and/or all measurement time.

In embodiments, the measurement signal can be used to monitor the time scale of binding and debinding for the analyte. In this way, this can be used to dynamically track the binding and debinding of the analyte and the process allows for numerous replicates on the same site. The time scale of binding/debinding will be different for each analyte and each will have its own signal fingerprint.

Force

The methods and systems involve applying a field to the sensing surface in a debinding step, the field being configured to apply a force to cause at least a portion of the specifically-bound analyte species to debind from the capture species. In some embodiments, a field can additionally be applied to provide a force to cause an increase in binding in the binding step.

Force Types

The forces used in the steps disclosed above can be provided by any suitable means of generating a force using a field which acts on the species on the sensing surface. In some embodiments, the field is at least one of an electric field, a magnetic field and an electromagnetic field. Accordingly, in embodiments, the force may be as a result of an electric field, a magnetic field and an electromagnetic field acting on species within the sample. In the context of the system, in embodiments, the the field application unit is configured to generate an electric field and/or a magnetic field to provide the force. The species in question, which in some embodiments is the analyte, can therefore be or comprise a species which is susceptible to these fields. For example, where the field is an electric or electromagnetic field, the species (e.g. the analyte species and/or the detection species) may carry a charge (i.e. be a charged species). In embodiments where the field is a magnetic field, the species can be or comprise a species moveable under the force of a magnetic field, such as a ferroelectric species, a paramagnetic species, and/or a diamagnetic species.

This can be monitored over time to build up an interaction picture and provide further information on the analyte. For example, the kinetics of movement or the specific interactions could be used as a fingerprint indicative of the presence of the analyte and a quantity of the analyte. For example, the response may vary based on the speed of movement or interaction with the through holes based on the size and nature of the analyte.

For example, in some embodiments, this can be through the use of an electric field, magnetic field, ultrasound energy, thermal gradients, osmotic gradients, density gradients, and/or a fluid flow. In some embodiments, the force is provided by at least one of an electric field or a magnetic field (this may include an electromagnetic field), and may include both. Accordingly, in some embodiments, the field application unit comprises a plurality of electrodes configured to apply an electric field about the sensing element. In other embodiments, thermal gradients, osmotic gradients and/or density gradients can be used, for example by two different regions having different properties above and below the sensing layer to drive movement from one region to the other (e.g. from one side of the sensing layer, through the through holes, to the other side).

Debinding (detaching) the analyte from the capture species requires a force to be applied which is sufficient to overcome the interaction between these elements. In the case of an electric field, the force applied will also depend on the e.g. net electric charge of the species it is acting on, as well as the interaction between the species, such as strength of the bond. In embodiments, the force applied is in the range of 10 to 400 pN, such as 30 to 400 pN, such as 30 to 300 pN. Accordingly, in embodiments, during a debinding step, the force applied to the bound analyte is from of 10 to 400 pN. The force applied during the other steps can be similar or less than this, such as less than or equal to 50 pN, less than or equal to 40 pN, less than or equal to 30 pN or less than or equal to 10 pN. These forces can be provided by generating an electric field using the voltages mentioned above, for example, particularly in or immediately adjacent structures such as through holes which will provide an electric field concentrating structure (e.g. at the edges of the through holes). In some embodiments where an electric field is used, the electric field may require a strength of from $0.5 \times 10^6$ V/m to $1 \times 10^8$ V/m, such as $1 \times 10^6$ V/m to $2 \times 10^7$ V/m. This may be present in the localised regions around the through holes and need not be throughout the entire applied field.

In embodiments, an electric field is used to provide the force. Generation of an electric field can be achieved by applying a voltage across a first electrode and a second electrode located adjacent to (i.e. next to or abutting) the sensing element. The sample (e.g. fluid, such as a solution) can be received between the electrodes.

In embodiments, the voltage used to generate the field may be at least 500 mV, at least 750 mV, at least 1V. For example 500 mV to 10 V, such as 1V to 5V. For example, where AC is used, this can be from 500 mV to 25 V, such as from 1V to 25V, such as from 1V to 5V. Where DC is used, this can be from 500 mV to 1.5 V.

The forces mentioned above in respect of the debinding step can be provided by generating an electric field using these voltages mentioned above. As noted above, the force applied will depend on the net electric charge of the species it is acting on. This force applied will depend on the net electric charge of the species it is acting on. For example, in some embodiments, the electric field may require a strength of from $0.5 \times 10^6$ V/m to $1 \times 10^8$ V/m, such as $1 \times 10^6$ V/m to $2 \times 10^7$ V/m. This may be present in the localised regions on the surface and need not be throughout the entire applied field. It will be appreciated that in any of the embodiments mentioned here, although the resultant force of the electric field acting on a particular component (e.g. the analyte or non-analyte species) will depend on a number of factors, including the charge on the component, the magnitude of the force will be determined by the magnitude of the electric field such that a higher V/m value will lead to a greater force acting on the species in the sample.

In some embodiments, other parameters of the electric field are varied, such as frequency. In embodiments, any appropriate AC frequency can be used in any of the binding/debinding steps set out herein. For example, the ac signal frequency may be 10 kHz.

In embodiments, during the binding step, the voltage across the first electrode and second electrode is selected from −750 mV to 750 mV. For example, in certain embodiments, the voltage (i.e. potential difference) can be −500 mV to 500 mV, 0 to 500 mV, or −350 mV to 350 mv, such as 0 to 350 mV. As set out above, this can be at least one discrete value within these ranges, or may comprise a ramp or step through these ranges.

In other embodiments, a magnetic field can be applied. This can be applied, in some embodiments, using electrodes forming an electromagnet.

In some embodiments, the capture species and/or analyte may comprise an amplifying element responsive to the force, such as electric and/or magnetic fields, where used, such as electro-active element or moiety or a magnetic-active element or moiety. The amplifying element can increase the response of the capture species to the force used to manipulate the analyte and provide useful kinetic data. This can also enable manipulation where the capture species and/or analyte would otherwise not permit manipulation (e.g. due to no charge).

Force Profiles

The application of force during a debinding step, and/or a binding step where a force is present, in embodiments can be a continuous application of a single force. Alternatively, the force may be varied during each step. Similarly, where there are plural debinding and/or binding steps, each iteration may use the same or a different force. Various combinations can be used to provide different information. For example, each may lead to different response thereby providing different information on the binding. For example, different approaches may lead to different detachments and/or interactions between the sensing layer and the species, including analyte species which are specifically bound and species in the sample which are non-specifically bound.

For example, in embodiments, the strength or intensity of the field is varied (e.g. by the control unit), for example, the electric field may vary between a minimum and a peak or maximum strength. Where this is an electric field, this can be achieved by varying the voltage across the electrodes used to generate the field, for example, or could be achieved by other means such as moving the relative position of the electrodes. In embodiments, the field may be varied by at least one of the following methods: a linear ramp or sweep where the intensity is increased at a (steady) rate (e.g. 1 mV/m/s), a non-linear ramp or sweep where the intensity is increased at varying rate(s), at least one step change increase, or combinations thereof. Each can be between the whole range or a part of the range between the minimum and maximum. Where it is the former, these can be combined in a single step of varying. Alternatively, each could be employed in multiple separate applications of a field. Ramps are useful from the perspective of examining each of the varying degrees of interaction at various strengths of field.

In some embodiments, switching between the debinding step and binding step may comprise switching between the polarity of the field.

Additional Manipulation

Additionally, there may be supplementary modification by modifying a property, such as an "environmental property" or "sample solution property" of at least a portion of a sample received on the sensing surface in a region adjacent (i.e. next to or on) the sensing surface. The property can include physical properties, such as thermal properties (e.g. temperature), and/or chemical properties selected from at least one of the pH, electrical conductivity, thermal conductivity and/or ionic strength of the sample or a portion thereof, for example to create localised regions having a different property. In one embodiment, a set of modification electrodes is configured to modify the property. The property may be modified directly, e.g. by direct application of heat to change the temperature, or indirectly for example by causing a chemical change which in turn changes the property, such as hydrolysis or electrolysis due to application of electrical energy which can change the pH. This can be used to modify the binding relationship between the capture species and the analyte. By binding relationship, it is meant that a property of or the nature of the binding relationship between the capture species and the target analyte. That is, the change in environmental property will modify one parameter of the binding between the capture species and the target analyte. In some embodiments, this can be the ability of the two to bind. For example, the change in property may prevent binding, or reduce binding rate to the extent that binding is too slow to be measured at an appreciable level (e.g. above the limit of detection (LOD) within a measurement time frame) so as to facilitate debinding. For example, a temperature increase can decrease incubation time by increasing the rate of binding ($K_{on}$). In the case of some biomolecules, such as antibodies and a corresponding antigen, without wishing to be bound by theory, the rate of binding at or close to 37° C. is higher than that at room temperature (e.g. 21° C.), even if limited to the region adjacent the sensing surface only (i.e. without increasing the bulk temperature). Ionic strength and pH (which are linked) also modify the binding parameters. For example, certain molecules are only charged within small pH ranges and may not bind to the corresponding moiety if not charged. Modification of the pH can change the propensity of the capture species and target analyte to bind, which can provide additional information on binding and kinetics of binding. In some cases, this can lead to dissociation. Changes in pH and/or ionic strength can also be used where the sample comprises other non-analyte species, by modifying the solution to a point where e.g. non-selective binding is reduced or eliminated. Moreover, pH is a critical factor in many aspects of biological processes and, indeed, is heavily susceptible to variation in biological samples, for example due to biological processes (e.g. $CO_2$ or lactate production by cells).

Analyte and Capture Species

The analyte may, for example, be selected from a molecular species, a metal ion, a virus, and a microorganism. Biomolecule analytes are particularly useful and may, for instance, be a hormone selected from an eicosanoid, a steroid, an amino acid, amine, peptide or protein, a nucleic acid, single or double stranded DNA, peptide nucleic acid.

Any suitable analyte capture species can be selected, according to the analyte which is intended to be sensed by the sensor assembly. For example, the capture species may comprise an antibody with specificity for a particular antigen. In such an example, the analyte may take the form of the antigen. More generally, the capture species may, in some embodiments, comprise at least one selected from a protein, a peptide, a carbohydrate, a nucleic acid, and an aptamer. The protein may, for example, be an enzyme, such as an enzyme having specificity for the analyte. In other non-limiting examples, the protein is an antibody. In the latter case, the analyte may be an antigen which is specifically bound by the antibody. The capture species may, for instance, comprise or be defined by an antigen. In this case, the analyte may be a species, such as an antibody, which is specifically bound by the antigenic capture species. The antigen may be or comprise, for example, a protein, a peptide, a carbohydrate, such as a polysaccharide or glycan. In an embodiment, the analyte capture species comprises an aptamer. An aptamer may be defined as an oligonucleotide or peptide configured to bind the analyte. Such an aptamer may, for example, be configured to interact with, for example bind, various analyte types, such as small molecules, for example amino acids or amines, proteins, metal ions, and microorganisms.

In one embodiment, the capture species comprises at least one aptamer selected from an oligonucleotide, a polynucleotide, a peptide, or a combination thereof. Such aptamers, as well as other biological species such as antibodies, are well suited to the sensor assemblies and methods disclosed herein.

The capture species (for example, a plurality of individual capture species) is located adjacent to (i.e. next to or abutting) or on the sensing surface. The interaction between the analyte and the capture species will alter the measurement signal obtained. In some embodiments, the capture species is provided on (e.g. adhered to or bound to) the sensing surface (e.g. the surface of an electrode or sensing layer). In some embodiments, the sensing surface is functionalized with the capture species. Such functionalization can be achieved in any suitable manner, such as by covalently or non-covalently immobilizing the capture species to the surface.

In some embodiments, a detection species may be provided to the sample, wherein the detection species is configured to specifically-bind to the analyte (e.g. a part other than that to which the capture species can bind). The detection species may be provided when the analyte is specifically bound to the capture species or before this occurs. The detection species may be an amplification species for amplifying the measurement signal or response, or may be a different species, for example provided with the purpose of increasing the selectivity of the measurement. This can in embodiments be as part of a sandwich assay.

More generally, the sensing element is arranged to receive a sample matrix. Sample matrix refers to the sample as a whole, including the analyte if present. Thus, it may comprise a carrier (such as a liquid) and the analyte. The sample matrix may be, for example, blood, urine, sweat, tears, etc., and may (potentially) contain the analyte. In an embodiment, the sample matrix is a liquid.

Transduction

In the methods and system disclosed herein, the transducer mechanism(s) used to determine the measurement signal may be any suitable method of transduction. For example, this may comprise measuring the potential (e.g. voltage), current, permittivity, charge and/or frequency. In some embodiments, the sensing element comprises at least one working electrode either forming the sensing surface or adjacent and addressing an element forming the sensing surface. In some embodiments, changes in or interactions with the functional layer formed by the capture species on the sensing surface can be detected through changes in potential. In other embodiments, changes may be determined by monitoring changes in current passing through each sensing site (at a constant potential).

System

The system may be configured to perform any of the method steps disclosed herein. Moreover, any of the embodiments set out herein with respect to the method apply equally to the system, and any of the embodiments set out herein with respect to the system apply equally to the method. For example, the method may additionally comprise carrying out any of the steps the control unit, signal processing unit and/or property determination unit are configured to carry out.

In some embodiments, the field application unit (or field generation unit) is configured to generate an electric field and/or magnetic field. In embodiments, the field application unit may comprise a plurality of electrodes configured to provide the electric field and/or magnetic field, and in some further embodiments the plurality of electrodes comprises at least a first electrode provided above the sensing layer and a second electrode provided below the sensing layer.

In one embodiment, the control unit is further configured to operate the field application unit to apply a field to sample on the sensing surface to increase the rate of binding of analyte to the capture species in the binding step. In an embodiment, the field application unit is configured to apply a directional field (i.e. a field which creates a force having a direction) and wherein the control unit is configured to operate the field application unit to apply a field to sample on the sensing surface to increase the rate of binding of analyte to the capture species in the binding step by applying a field which causes the analyte to move towards the sensing surface.

In one embodiment, the system may further comprise a signal processing unit configured to process measurement signals received from the sensor assembly; and the property determination unit may receive processed signals from the signal processing unit. The property determination unit may, in certain embodiments, be configured to determine the property based on the absolute change in measurement signal and/or the rate of change of the signals.

The control unit, property determination unit and/or signal processing unit may each (individually or combined) be a processor or controller. The control unit may incorporate the property determination unit and/or the signal processing unit or may be in addition to these. The control unit, signal processing unit, and the property determination unit may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments include, but are not limited to, conventional microprocessors, application specific integrated circuits (ASICs), and field-programmable gate arrays (FPGAs). In various implementations, the control unit, the signal processing unit, and/or property determination unit may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or control unit.

In one aspect, a computer program comprising computer program code which is configured, when said computer program is run on one or more physical computing devices, to cause said one or more physical computing devices to implement the methods disclosed herein.

In one aspect, one or more non-transitory computer readable media having a computer program stored thereon, the computer program comprising computer program code which is configured, when said computer program is run on one or more physical computing devices, to cause said one or more physical computing devices to implement the method disclosed herein.

Sensing Element

The sensing site can be a surface of a sensing layer (e.g. an electrode). In some embodiments, this may comprise or be formed from copper, nickel, platinum, silver, silver chloride, gold or other noble metals. In some embodiments, this may comprise or be formed from $TiO_2$ or indium tin oxide (ITO). Other sensing sites may include a substrate with a coating on which the anchor species is immobilized. For example, the sensing site may be a glass substrate with an ITO coating thereon. In other embodiments, the sensing site may comprise or be formed of carbon (graphene, graphene oxide, or nanotubes), silicon dioxide, aluminum oxide, and/or silicon. Sensing layers can provide immobilization of capture species through both covalent-like interactions (e.g. chemisorption of anchor species onto the surface through chemical bond formation) and non-covalent-like interactions (e.g. physisorption of capture species onto the surface through weaker, often van der Waals, interactions) depending on the identity of the surface and the capture species. Provision of the capture species to the sensing site can be achieved through techniques such as spin-coating, physical vapor deposition or electrophoretic deposition. Alternatively, other methods can include immersion of the sensing site in solution.

The sensing element (or "sensing device") comprises a sensing surface, a capture species configured to specifically bind with an analyte provided on the sensing surface, and at least one measurement electrode configured to provide a measurement signal indicative of a property of an analyte in a sample provided on the sensing surface. That is, the measurement electrode is addressable to provide the measurement signal.

At least a part of the sensing element therefore defines the sensing surface. This could be defined by the measurement electrode (e.g. a surface thereof) or may be defined by a separate sensing layer (for example, in some embodiments, the sensing element comprises a sensing layer defining the sensing surface and the electrode may be addressable to provide the measurement signal indicative of the interaction of the sensing layer and electrode), or a combination thereof. For example, the sensing layer may be provided between two electrodes (e.g. a chemiresistor). Where there are plural electrodes, each may be individually addressable.

Where present, the sensing layer may comprise or be a dielectric layer. In embodiments, the dielectric layer may comprise or be a polymer layer, a glass layer, a glass-ceramic layer, a ceramic layer, a metal oxide layer, a metal nitride layer, a silicon-based layer or combinations thereof. In certain embodiments, the dielectric layer comprises or is a polyimide, silicon dioxide, or silicon nitride layer. In some embodiments, the sensing layer is a nanoporous membrane, with the nanopores forming the through holes (structures) on the nano-scale (e.g. 1 to 1000 nm, or 1 to 100 nm). In one further embodiment, the measurement electrode(s) may be embedded within the sensing layer.

In embodiments, the measurement electrode(s) may be formed from or comprise metals, metal oxides, metal nitrides, carbon-based materials, a conductive polymer, doped silicon or polysilicon or combinations thereof. In an embodiment, the measurement electrodes may be formed from or comprise gold, silver, copper, platinum, nickel, titanium, titanium nitride, ruthenium, ruthenium oxide or combinations thereof.

In one embodiment, the sensing element comprises a sensing layer, the sensing layer having a plurality of structures formed therein; and wherein the measurement signal is dependent on the location of analyte relative to the plurality of structures in the sensing layer. Such an arrangement has been found to provide a particularly useful tool for determining a property of an analyte, since the relative position of the analyte within or around the structures can have a significant effect on the properties. In a further embodiment, the measurement signal is indicative of an impedimetric property (e.g. dielectric property (e.g. permittivity), resistance, capacitance, impedance, conductance, or a combination thereof) of the sensing layer; and wherein the plurality of structures are arranged on or in the sensing layer such that an analyte received between or within the structures modifies the impedimetric property, and therefore the measurement signal. That is, it measures an impedimetric property, which in one embodiment is based on the permittivity of the sensing layer.

The sensor assembly of the system comprises a sensing element. In some embodiments, the sensing element comprises a sensing layer, the sensing layer at least partly defining the sensing surface and having a plurality of structures formed therein. In such a structure, the measurement signal is dependent on the location of analyte relative to the plurality of structures in the sensing layer.

In one embodiment, the measurement signal is indicative of an impedimetric property of the sensing layer; and wherein the plurality of structures are arranged on or in the sensing layer such that an analyte received between or within the structures modifies the impedimetric property.

In some embodiments, the plurality of structures define a series of recesses (e.g. wells) or through holes (e.g. via) in the sensing layer. In embodiments, the recesses or through holes have a largest diameter (at their widest point) less than or equal to 2 μm, for example from 50 nm to 1 μm. In some embodiments, the through holes have a diameter (at their widest point) of less than or equal to 1000 nm, for example less than or equal to 800 nm, less than or equal to 500 nm. This may be from 1 nm to 2000 nm, 1 nm to 1000 nm, 1 nm to 800 nm, 1 nm to 500 nm, such as 10 nm to 1000 nm, 10 nm to 800, 10 nm to 500 nm, 50 nm to 2000 nm, 50 nm to 1000 nm, 50 nm to 800, 50 nm to 500 nm, 100 nm to 1000 nm, 100 nm to 800, or 100 nm to 500 nm. In one embodiment, the recesses or through holes have a narrowest diameter of at least 0.5 nm, for example at least 1 nm, or at least 10 nm. Recess or through hole radius will impact the response to an analyte: a larger recess or through hole will have a response which is more dependent on the materials within it. A smaller recess or through hole may be selective to particular analytes. In embodiments where the sensing layer comprises through hole(s), the sensing element may be arranged in the fluid chamber such that sample can reside above the upper surface, reside below the lower surface sensing layer and pass through the through holes in the sensing layer.

Specific Uses

In embodiments of the methods and systems disclosed herein, these can be used to distinguish between minor mutations or modifications of analyte species, such as biomolecules or structures. Specifically, there is a need to be able to distinguish between the types of modifications or differences which occur, either through modification or during synthesis, in species such as DNA or proteins. Traditional methods such as chromatography or mass spectroscopy focus on the mass and/or size of these species, making it different to distinguish where structural differences exist but where the mass or size differences are too small to reliably determine or filter out mismatches. This is particularly the case for biomolecules, where the relative size or mass of the total molecule is typically large as compared to the difference in physical size or mass resulting from the mismatch.

For example, in one embodiment of the methods, sensor assembly and systems disclosed herein, these can be used to identify DNA or RNA mismatches or differentiate/separate DNA or RNA based on the degree of differentiation. DNA or RNA mismatches can occur during the synthesis (e.g. by replication) of DNA or RNA where there is a mismatch between the original DNA or RNA and the synthesized version. This can be as a result of inserting an incorrect nt (or base pair) or deletion of a base pair, for example. Another example is a modification, for example as a result of glycosylation of the DNA/RNA. Such mismatches will alter the binding affinity between the capture species and the DNA or RNA (i.e. analyte) of interest due to a mismatch between the capture species and the analyte. A complete match will have a first binding affinity, some minor mismatch may still bind but with a lower affinity, and more mismatched bases will lead to no selective binding of the capture species and the DNA/RNA. Distinction between the binding components can be determined by the binding affinity, and specifically by the force required to remove the DNA/RNA being analyzed.

This can be determined based on the force applied during the debinding steps (for example). Alternatively or additionally, the method may comprise applying a force of a first magnitude which is less than the force used to cause the target analyte to debind so as to cause non-target analyte to debind. This can be less than the force required to overcome the binding affinity between a non-mismatched (i.e. perfect matched DNA or RNA structure), or in some embodiments a mismatched DNA or RNA structure which is a sufficiently close match (e.g. <1% of bases mismatched, or less than 0.1% of bases) such that only components which are (i) either not specifically bound or (ii) are bound to the capture species but with a binding affinity which is lower than the desired DNA or RNA structure will be removed. This allows the method to strip away any mismatched DNA or RNA. Any DNA or RNA having the desired structure will remain bound to the capture species and be retained on the sensor assembly. Subsequent analysis can be used to determine the amount of DNA/RNA which remains, for example measurement, manipulation and/or detachment steps. This may be increased as a ramp until the force is sufficient for the analyte to debind.

Additionally or alternatively, this can be used as a filter. Specifically, the non-desired species can be removed from the system after it has been detached from the capture species. Subsequently, the disclosed debind steps can be used to detach the desired DNA or RNA from the sensor assembly and retained as a separate component.

In one other embodiment, and using the same techniques and steps as set out above for the DNA/RNA mismatch, another embodiment includes determining changes in a protein, for example due to glycosylation, or filtering out glycosylated and non-glycosylated proteins.

Specific Embodiments

Figure 1:
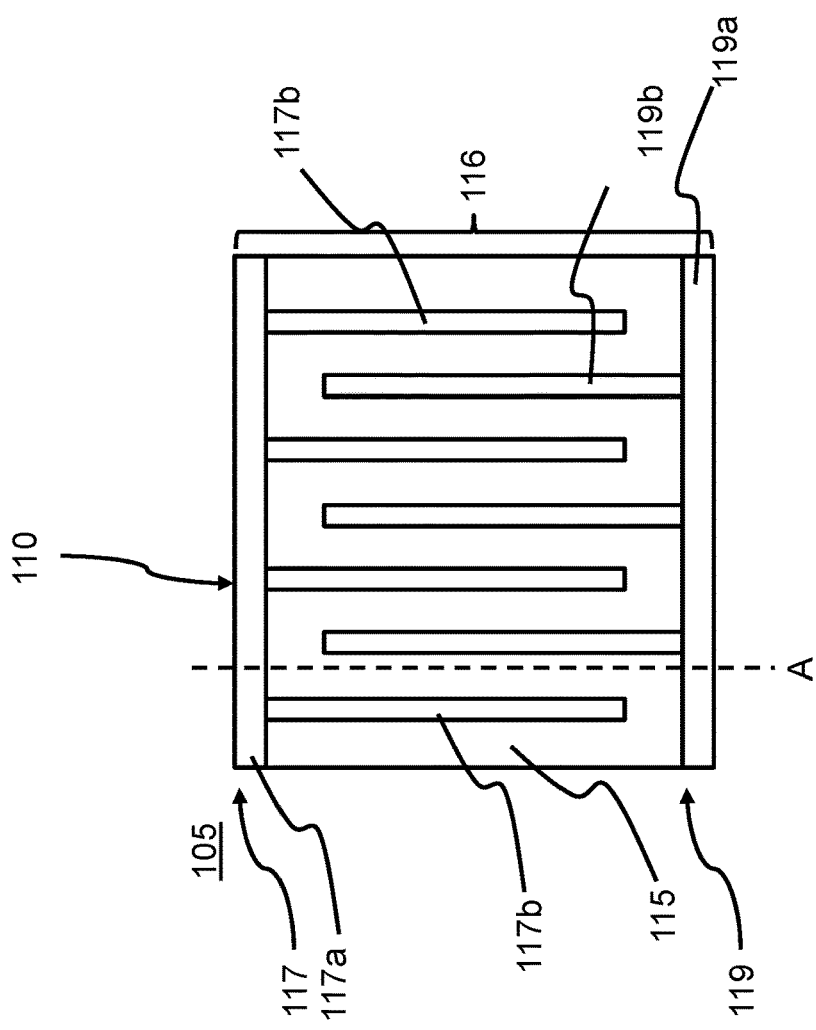
FIG. 1 provides a schematic plan view of a sensor assembly according to an embodiment.

FIG. 1 provides a schematic plan view of a part of a sensor assembly 105 for determining a property of an analyte 2 in a sample and which is used in a system according to an embodiment. FIGS. 2 and 3A-3D schematically depict a system 100 comprising the sensor assembly 105 of FIG. 1, with FIGS. 3A-3D providing a cross-section through the plane depicted by line A of FIG. 1, together with additional components of the system. It will be appreciated that the schematic drawings are provided to exemplify the concepts provided herein and the components, such as the capture species, are not intended to be to scale.

In this embodiment, the sensor assembly 105 comprising a sensing element 110, the sensing element 110 comprising a sensing layer 115 and a measurement interdigitated electrode (IDE) 116. The sensing layer 115 in this embodiment is formed of a dielectric material and is functionalised with capture species 120 configured to specifically bind with the analyte provided on its upper surface (sensing surface 121), as is visible from FIGS. 3A-3D. The measurement IDE 116 surrounds the sensing surface 121 of the sensing layer 115 and interrogates the sensing layer 115 in this region to provide a measurement signal indicative of a property of the analyte 2 within the sensing surface 121 and, in particular, of the interaction of the analyte with the capture species 120. Specifically, binding of the analyte 2 with the capture species 120 causes an electronic change in the sensing layer 115 which can be detected by addressing the measurement IDE 116.

The IDE 116 is formed from a first electrode 117 and a second electrode 119 arranged in an interdigitated configuration, as visible from the plan view of FIG. 1. Specifically, the first electrode 117 comprises a first connector 117a which extends along one side of the sensing layer 115 and from which plural first extension portions 117*b* extend perpendicularly. These first extension portions 117*b* are spaced apart from one another. The second electrode 119 comprises a second connector 119*a* which extends along the opposite side of the sensing layer 115 to the first connector 117*a* and plural second extension portions 119*b* extend perpendicularly from the second connector 119*a* towards the first connector 117*a*. The second extension portions 119*b* are also spaced apart from one another but are staggered as compared to the first extension portions 117*b*. In this way, the second extension portions 119*b* are received between the first extension portions 117*b* to form the IDE 116. This allows the measurement IDE 116 to detect changes in the sensing layer 115 caused by interaction of analyte 2 with the capture species 120. Moreover, the use of the measurement IDE 116 can enable the miniaturisation of the system by eliminating the need for a reference electrode, without sacrificing or reducing the accuracy of the system, enabling use in point-of-care situations, for example since it does not necessarily require a reference electrode, thereby permitting miniaturisation; however, it will be appreciated that other electrode structures and sensing modalities could be used.

The system 100 also comprises a field application unit 140 (see FIG. 2 and FIGS. 3A-3D) which is configured to apply a field to the sensing surface 121 so as to apply a force to any sample adjacent the sensing surface 121, as will be set out in more detail below. The field application unit 140 in this embodiment applies an electric field to the sample and comprises a first electrode 144 provided above the sensing layer 115 and a second electrode 142 electrically connected to the first electrode 144 and located below the sensing layer 115. The first electrode 144 and second electrode 142 are configured to apply an electric field through the sample matrix and about the sensing element 110—i.e. where the interaction between capture species 120 and analyte 2 will occur.

The system 100 further comprises a control unit 150 which is a processor configured to operate the field application unit 140. Specifically, the control unit 150 is configured to operate the field application unit 140 to generate the electric field using the first and second electrodes 144, 142, as will be explained in more detail below. The system 100, and in this embodiment the control unit 150 specifically, also comprises a property determination unit configured to determine the property of the analyte. This determination is based on the measurement signal obtained from the sensing element 110, as detailed below.

Figure 4:
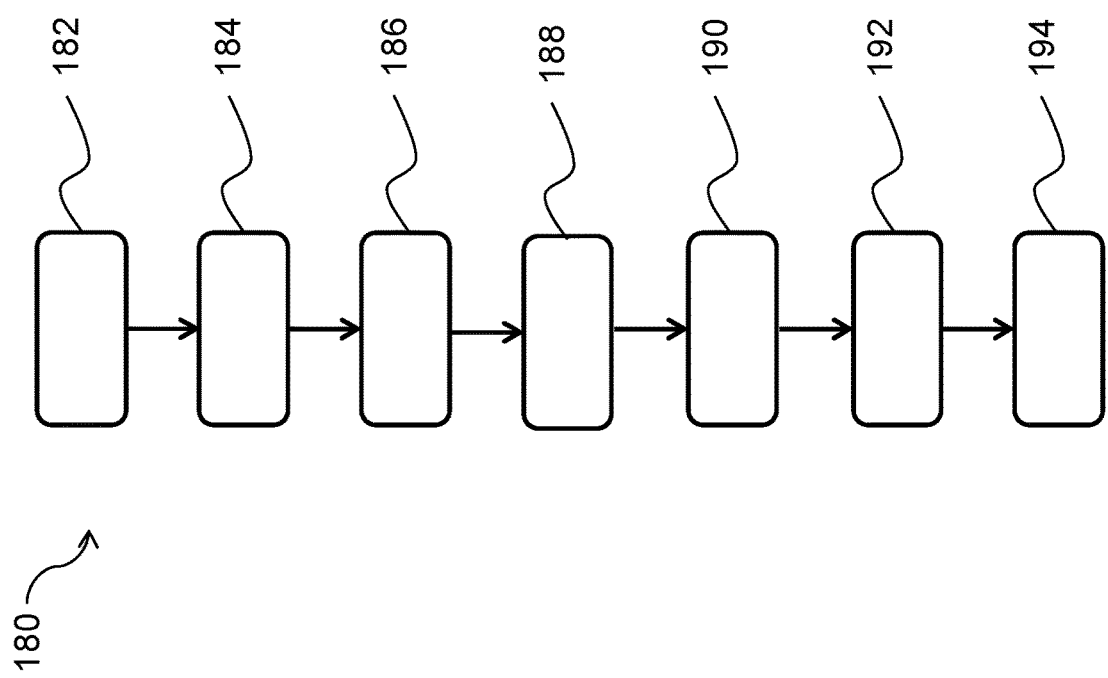
FIG. 4 provides a block diagram of a method according to an embodiment.

A method 180 of determining a property of an analyte in a sample, using the system 100, is depicted in FIG. 4 and set out below with reference to FIGS. 3A to 3D. In this embodiment, the method 180 initially comprises providing 182 the sensor assembly 105, which is in the form of system 100 and which has the components set out above.

The method 180 further comprises providing sample to the sensing surface 121 in step 184. The sample contains analyte 2 which is provided to the system 100 as shown in FIG. 3A. The analyte 2 in this embodiment is a species, namely a DNA sequence and the capture species 120 is a corresponding nucleic acid sequence which can specifically bind to the analyte 2 DNA sequence. As a result, analyte 2 can be influenced and moved by the electric field. In this embodiment, initially incubation can occur whereby analyte 2 will diffuse (and my otherwise flow) towards the capture species 120 forming the sensing surface 121 and will specifically bind to the capture species 120 to form specifically-bound analyte 2', as depicted in FIG. 3B. In this embodiment, no field is applied to the sample using field application unit 140.

The method 180 further comprises a debinding step 186 which comprises applying a field to the sensing surface 121, the field being configured to apply a force to cause at least a portion of the specifically-bound analyte species 2" to debind from the capture species 120. In this embodiment, the debinding step 186 comprises causing the control unit 150 to operate (actuate) the field application unit 140 so that the electric field is generated between the first and second electrodes 144, 142. The energy provided by the field overcomes the binding affinity between the capture species 120 and the analyte 2 in the bound complexes and thereby causes debinding of the analyte 2. This causes a change in the measurement signal transduced by the measurement IDE 116. The method 180 also comprises obtaining 188 the measurement signal before, during (throughout the duration) and after the debinding step 186.

Moreover, the directional force of the electrical field, which in this embodiment has a direction travelling towards the first electrode 144 from the second electrode 142. This drives the unbound analyte 2 species away from the sensing surface 121 (in the direction of arrows D) and therefore reduces the concentration of analyte 2 in the region adjacent and on the sensing surface 121, which can increase the rate of dissociation further. This also has the effect of removing any non-analyte species 4 which may non-specifically bind to sensing layer 115. Although the main interaction of interest is that between the capture species 120 and the analyte 2, which will contribute to a response in the measurement signal, the non-specific binding of various species will also contribute to the signal. This interaction can reduce the sensitivity of the measurement and slow down the measurement process. In some cases, non-specific binding can lead to sensor failure. The debinding step 186 will remove at least some of this.

The method 180 further comprises removing or modifying the field so as to allow at least a portion of analyte 2 specifically bind to capture species 120 to form a specifically-bound analyte species in a binding step 190. In the embodiment depicted in FIG. 3D, the force has been modified by a reversal of the direction of the field and by a reduction in the intensity. Specifically, this comprises causing the control unit 150 to operate (actuate) the field application unit 140 so that the electric field is generated between the first and second electrodes 144, 142 by applying a voltage thereto, with the polarity being the reverse of the debinding step 186.

Accordingly, the force applied is (significantly) less than that required to debind a bound analyte 2" from the capture species 120 and therefore the original affinity between analyte 2 and capture species 120 dominates the binding state of the species. Moreover, in this embodiment, because the force has been reversed, it is used to drive unbound analyte 2 towards the sensing surface 121 (in the direction of arrows B) which can increase the rate of binding $K_{on}$. This causes a change in the measurement signal transduced by the measurement IDE 116. The method 180 therefore also comprises obtaining 192 the measurement signal before, during (throughout the duration) and after the binding step 190.

Finally, the method 180 comprises determining the property of the analyte 194 in the sample based on the measurement signal before and during the debinding step and during and/or after the binding step. AS set out above, each of the binding step 190 and debinding step 186 can be used to determine information about the analyte, including determination of affinity of binding from the debinding step 186 in particular and the concentration from the entire measurement. Moreover, the presence of the debinding step 186 will also improve the accuracy/sensitivity by also driving non-specifically bound species from the sensing surface 121 (and at a rate and speed faster than removal of specifically bound analyte 2").

Figure 5:
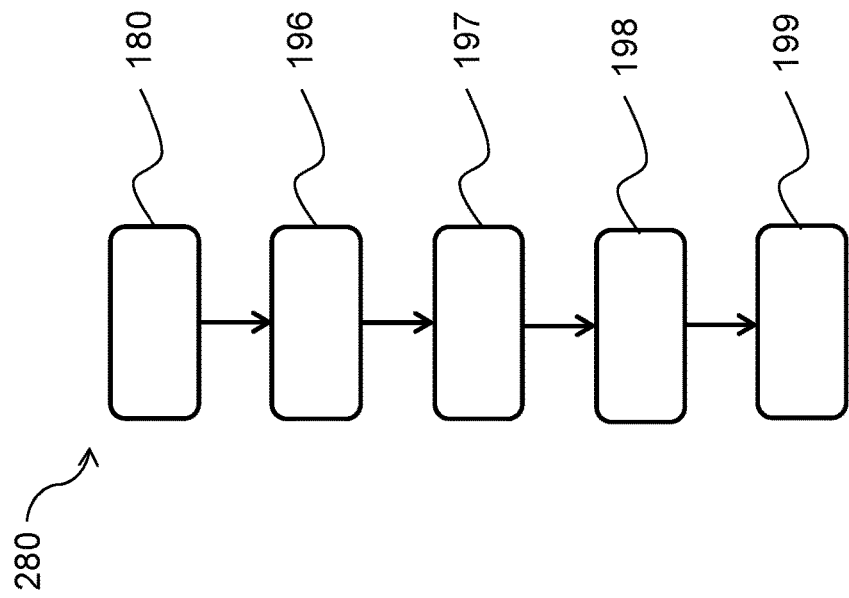
FIG. 5 provides a block diagram of a method according to an embodiment.

A further method 280 of determining a property of an analyte in a sample, using the system 100, is depicted in FIG. 5. This method 280 comprises first carrying out the steps of method 180 as depicted in FIG. 4 and set out above. The method 280 further comprises alternating plural binding steps and plural debinding steps and obtaining the measurement signal during the plural debinding step and binding steps.

In particular, the method further comprises carrying an additional debinding step 196 after the binding step 190 of the method 180, carrying out an additional binding step 197, obtaining the measurement signal during the plural debinding step and binding steps 198 and determining the property based on the signal during the plural debinding step and binding steps 199. This can be repeated for any number of repetitions or cycles.

FIGS. 6A to 6D depict example parameters for applying the electric field in the methods disclosed herein and using the systems disclosed herein (e.g. the system 100 of FIG. 2), with voltage (V) plotted against time (T).

FIG. 6A depicts a linear ramp over time from no electric field to a maximum electric field strength, which for the debinding step is greater than or equal to that which would cause detachment of specifically-bound analyte 2', followed by a decrease to 0V for the binding step, which in this embodiment is carried out without the application of any field. This initial ramp can lead to staggered removal of the species, starting with non-specifically-bound species and subsequently bound analyte. Moreover, by ramping the electric field force (and optionally other components such as frequency), the electric field can be used as a tool for force spectroscopy with corresponding change in signal can be used to determine the binding force.

FIG. 6B depicts a hold at a single intensity (or field strength) for the debinding step, followed by a drop to no field for the binding step.

FIG. 6C depicts a hold at a single intensity (or field strength) for the debinding step, followed by a drop to a reverse polarity, but lower strength field for the binding step. The presence of the lower strength field can help drive analyte towards the sensing surface so as to increase the rate of binding.

FIG. 6D depicts an alternating application of the electric field where the polarity is switched, in a similar manner to FIG. 6C, but with the process repeated plural times so that there are 3 debinding steps and 2 binding steps.

FIG. 7 provides an exemplary graph depicting a signal over time where the method includes debinding and binding steps. In the initial state of the sample between $T_0$ and $T_1$, the signal is at a first baseline level corresponding to the signal after a period of incubation. At $T_1$, a field is applied to the sample and debinding occurs. At this point, the measurement signal changes indicating that the analyte is being removed from the capture species. The measurement signal will provide information on the analyte, including binding affinity. The method then comprises switching to a binding state which is reflected in the signal change at $T_2$. The rate of change and shape of the response between $T_2$ and $T_3$, where the signal returns to the initial baseline level, will also provide information on the analyte and concentration. In this particular embodiment, this is repeated twice. This may be for confirmation and/or further intermediate steps may be carried out, such as flushing out non-binding species from the sample to further isolate the analyte.

Figure 8:
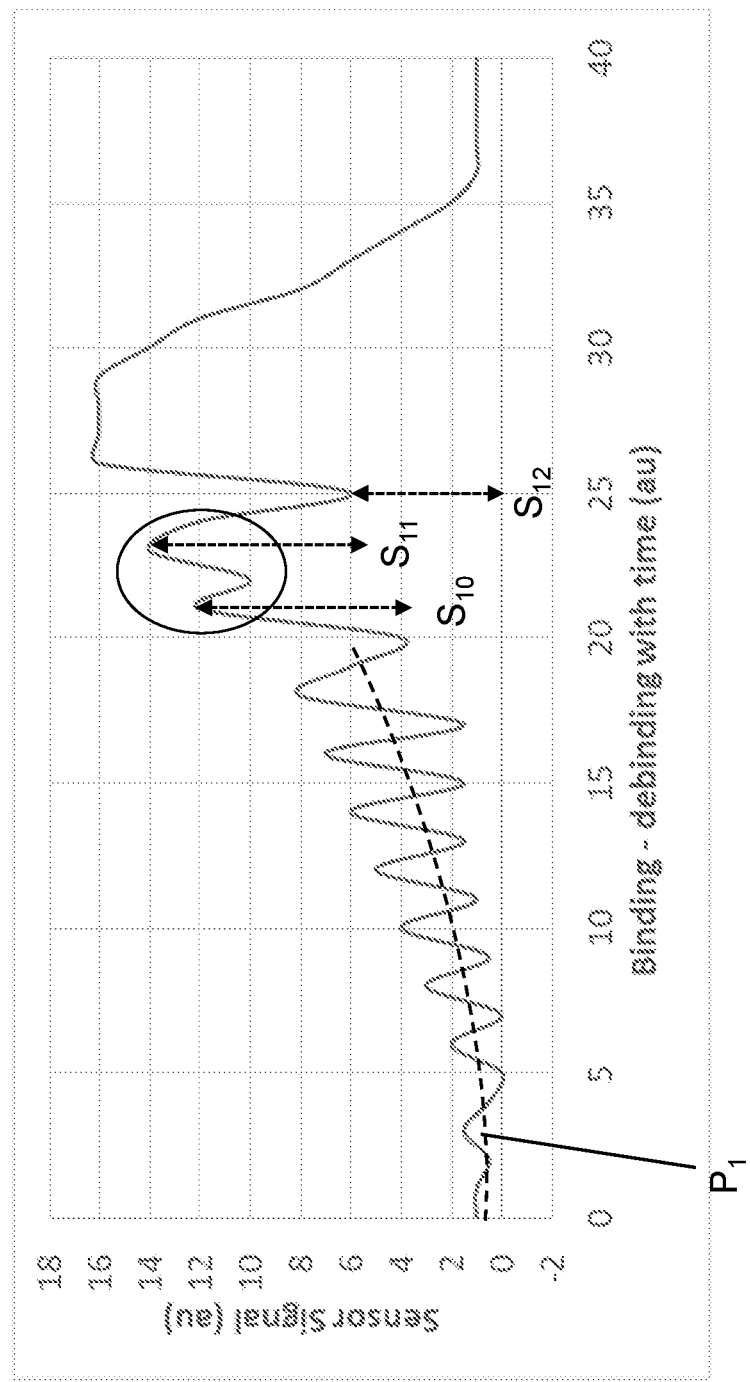
FIG. 8 provides an example signal response.

FIG. 8 provides a further exemplary graph depicting a sensor signal over time (au representing an appropriate unit), where the method includes plural cycling debinding and binding steps. In the initial period $P_1$, signal increases as binding/debinding differentiates specific and non-specific binding. Low force debinding will remove non-specific binding and by binding and debinding the non-specific component can be separated from the specific binding. In particular, non-specific readout gives a constant that can be removed from the total response to give a more accurate measurement of the binding. As force applied increases (per binding/debinding cycle), binding is encouraged and, at a certain point, the force applied overcomes the affinity between capture species and analyte (as opposed to waiting for the equilibrium). This gives information on the kinetic response. Examples include sensor response peaks at $S_{10}$ and $S_{11}$ relate to specific debinding and quantitation. Rate of debinding indicative of enhanced disassociation overcoming affinity-based rate constants (these can be tailored to specific assay requirements). Moreover, there can be an absolute debinding step where the force applied removes all specifically-bound analyte (the response from $S_{12}$ onwards, for example) providing a further indication of concentration. As a result of this profile, the kinetic response related to concentration can then be more accurately determined at an earlier stage—the concentration dependent on rate of change.

Figure 9:
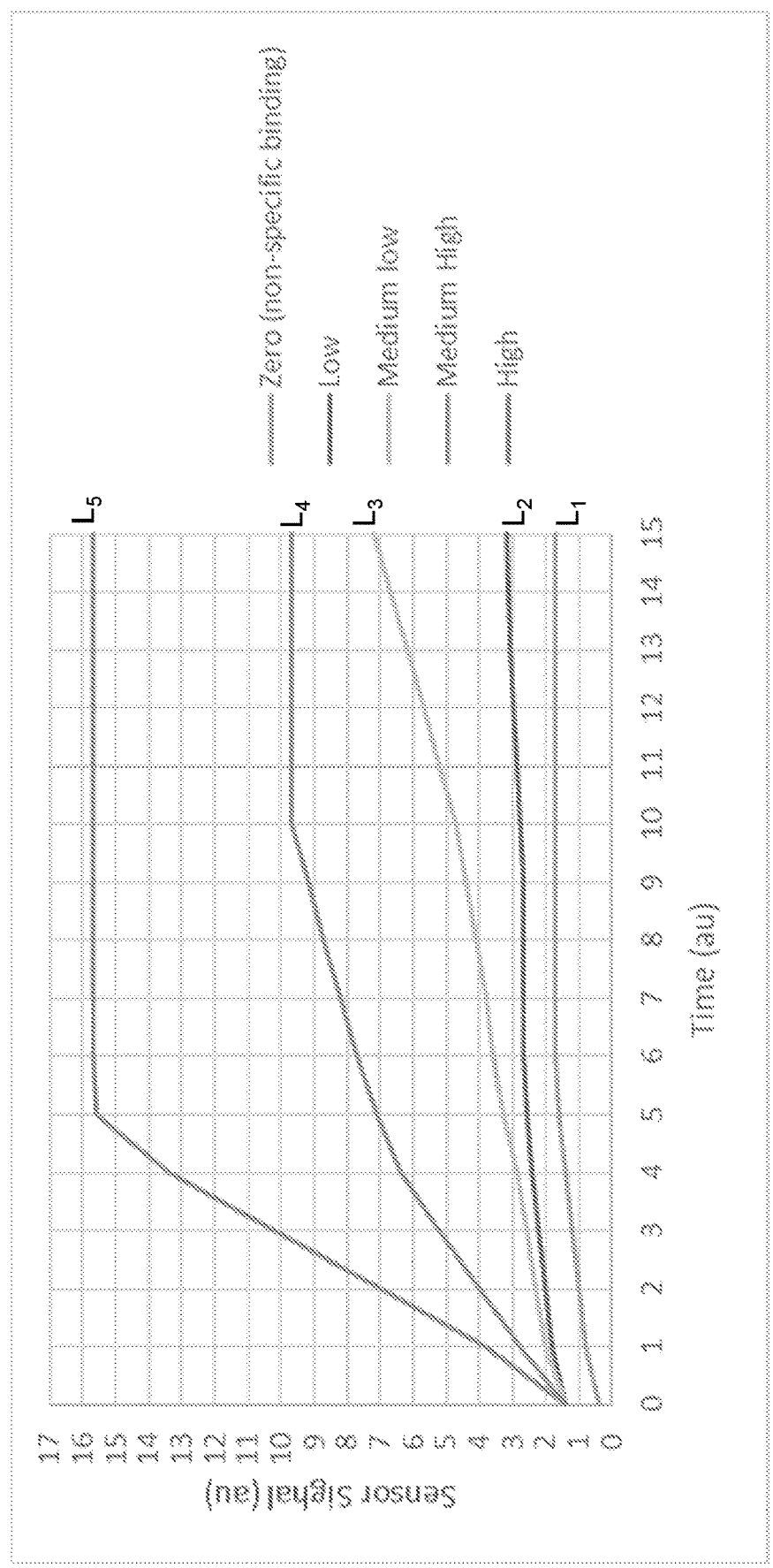
FIG. 9 provides a graph of rate of change for specific concentrations.

FIG. 9 provides a further exemplary graph illustrating how the kinetic information derived from measurements (such as that depicted in FIG. 8) can be used to more quickly arrive at useful information, such as a quantitative output, than end-point assays. FIG. 9 depicts a sensor signal over time (au representing an appropriate unit). Lines $L_1$ to $L_5$ represent a different signal response corresponding to different concentrations. $L_1$ is 0 (the response relating to non-specific binding only), $L_2$ to low concentration, $L_3$ to a medium-low concentration, $L_4$ to a medium high concentration and $L_5$ to a high concentration. As will be appreciated, the rate of change (i.e. the kinetic response) varies significantly depending on analyte concentration. This means that the rate of change can be used to accurate determine the concentration, and much sooner. For example, the rate of change where there is high concentration can be used to determine concentration after only a few time units, as compared to lower concentrations. The concentration dependent rate of change can also be used to determine if a longer measurement time is required (a dynamic system response) compared to a fixed end-point measurement). Using (e.g. repeating) the binding and debinding steps provides this information quickly and potentially repeatedly, thereby giving significant advantages over traditional end-point assays. Moreover, this also provides a further means of confirming that the quantitative value obtained is an accurate value, since the rate provides information on concentration as compared to the traditional end-point assay comparison of a linear response with a look-up table.

FIGS. 10 and 11 schematically depict a further embodiment of a system 300 comprising a sensor assembly 305. FIG. 10 provides a schematic plan view of the sensor assembly 305 and FIG. 11 provides a schematic cross-sectional view of the system with sensor assembly 305 taken along line A shown in FIG. 10. The sensor assembly 305 is similar in structure to the sensor assembly 105 of FIG. 1 in that it comprises a sensing element 310 which comprises a sensing layer 315 and a measurement IDE 316 formed from two measurement electrodes 317, 319. Specifically, the measurement IDE 316 is formed from a first measurement electrode 317 and a second measurement electrode 319 arranged in an interdigitated configuration. The first measurement electrode 317 comprises a first connector 317a which extends along one side of the sensing layer 315 and from which plural first extension portions 317b extend perpendicularly. The second measurement electrode 319 comprises a second connector 319a which extends along the opposite side of the sensing layer 315 to the first connector 317a and plural second extension portions 332b extend perpendicularly from the second connector 319a towards the first connector 317a. The second extension portions 319b are received between the first extension portions 317b in an interdigitated comb configuration. The sensing layer 315 in this embodiment is functionalised on a part of the upper surface with capture species 320 configured to specifically bind with the analyte 2 provided on the upper surface to form a sensing surface 321. The measurement IDE 316 surrounds the sensing surface 321 of the sensing layer 315 and interrogates the sensing layer 315 in this region to provide a measurement signal indicative of a property of the analyte 2.

The system 300 also comprises a field application unit 340 (see FIG. 11) which is configured to apply a field to the sensing surface 321 so as to apply a force to any sample adjacent the sensing surface 321, as will be set out in more detail below. The field application unit 340 in this embodiment applies an electric field to the sample and comprises a first electrode 344 provided above the sensing layer 315 and a second electrode 342 electrically connected to the first electrode 344 and located below the sensing layer 315. The first electrode 344 and second electrode 342 are configured to apply an electric field through the sample matrix and about the sensing element 310—i.e. where the interaction between capture species 320 and analyte 2 will occur.

The sensor assembly 305 of this embodiment differs from the sensor assembly 105 of FIG. 1 in the structure of the sensing layer 315. The sensing layer 315 in this embodiment comprises a plurality of through holes 330 extending from an upper surface to a lower surface and across the sensing surface 421 (as can be seen in FIG. 7). The sensing layer 315 is suspended in a chamber such that fluid resides on both sides of the sensing layer 315 and with the through holes 330 providing for passage of fluid from the region above the sensing layer 315 to below the sensing layer 315. The capture species 320 are provided on the upper surface adjacent the through holes 330. The measurement IDE 316 is therefore provided with the through holes 330 of the sensing layer 315 between the interdigitated portions of the first measurement electrode 331 and second measurement electrode 332. The use of the sensing layer 315 with through holes 330, or pores, provides a particularly useful tool for determining a property of an analyte. The configuration of the sensing layer 315 and the capture species 320 is such that analyte that is specifically bound to the capture species is able to modify an impedimetric property (e.g. relative permittivity or dielectric constant (both referred to herein as "permittivity")) of the sensing layer. As such, the relative position of the analyte within or around the through hole can have a significant effect on the measurement signal and can provide detailed information on the particular analyte, in addition to the information provided by the selective binding of the analyte to the capture species. Prior to interaction of the sensing layer with the sample, the impedimetric property of the sensing layer is determined by the sensing layer and any fluid within the through holes. However, once a species is received within through hole(s), the species will cause a change in this impedimetric property. Depending on the analyte property and its modulation of the signal the property to be measured may be due to double layer change or interruption, sensing layer thickness increase, faradaic or non-faradaic processes, transfer of charge, charge storage, or charge induction. For example, when an analyte is bound to the capture species and can interact with the through hole, such as enter and traverse through the through hole, the analyte (and/or a tag or detection species, which may enable the interaction with the through holes) will contribute to the impedimetric property of the sensing layer. It will be appreciated that this could be present in any of the embodiments, and that it is not limited to a particular modification unit or measurement electrode structure.

FIGS. 12A and 12B provide a further embodiment of a system 400 according to an embodiment, the system comprising a sensor assembly 405 comprising a plurality of sensing sites defined by a plurality of discrete and electrically isolated sensing layers 415A-C. 12A provides a schematic perspective view of a system 400 and FIG. 12B shows a cross-section through a single sensing site of the system 400.

The system 400 is a single molecule system which relies on a single capture species 420A located on each of the sensing layers 415A-C. That is, each individual sensing site defined by an individual sensing layer 415A-C comprises a single capture species 420A configured to specifically bind to an analyte 2 such that a single analyte molecule 2 will specifically bind to each site at any one time.

The system 400 also includes a field application unit (not depicted) configured to causing binding and debinding in the manner set out for the embodiment of FIGS. 10 and 11. In this embodiment, the field application unit can be used for a single iteration of binding and debinding or it can be used to cycle between binding and debinding steps.

FIG. 13 provides a graph for the signal output over time for the system 400. The y-axis denotes total binding events (cumulative binding events) (measured at a constant temperature). $C_1$ provides an exemplary output for a high-concentration sample, $C_2$ provides an exemplary output for a medium-concentration sample and $C_3$ provides an output for a low-concentration sample. Use of the field application unit can reduce the time needed to reach this data (and thus derive the concentration), as well as help to distinguish non-specific binding.

It should be understood that the detailed description and specific examples, while indicating exemplary embodiments of the apparatus, systems and methods, are intended for purposes of illustration only and are not intended to limit the scope. These and other features, aspects, and advantages of the apparatus, systems and methods of the present invention can be better understood from the description, appended claims or aspects, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended aspects or claims. In the aspects or claims, the word "comprising" does not exclude other elements or steps, and the indefinite article "a" or "an"

does not exclude a plurality. The mere fact that certain measures are recited in mutually different dependent aspects or claims does not indicate that a combination of these measures cannot be used to advantage. Any reference signs in the claims should not be construed as limiting the scope.

Aspects of the inventions will now be described:

Aspect 1: A method for determining a property of an analyte in a sample, the method comprising: providing a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; providing the sample to the sensing surface, wherein at least a portion of analyte specifically bind to capture species to form a specifically-bound analyte species; applying a field to the sensing surface in a debinding step, the field being configured to apply a force to cause at least a portion of the specifically-bound analyte species to debind from the capture species; obtaining the measurement signal at least before and during the debinding step; removing or modifying the field so as to allow at least a portion of analyte specifically bind to capture species to form a specifically-bound analyte species in a binding step; obtaining the measurement signal during and/or after the binding step; and determining the property of the analyte in the sample based on the measurement signal before and during the debinding step and during and/or after the binding step.

Aspect 2: The method of aspect 1, wherein the field is at least one of an electric field, a magnetic field and an electromagnetic field.

Aspect 3: The method of aspect 1 or aspect 2, further comprising allowing analyte to bind to the capture species without applying a field to the sensing surface in an incubation step; and obtaining the measurement signal during the incubation step.

Aspect 4: The method of aspect 3, further comprising applying a field to the sensing surface in the incubation step, the field being configured to apply a force to increase the rate of binding.

Aspect 5: The method of any preceding aspect, further comprising applying a field to the sensing surface in the binding step, the field being configured to apply a force to increase the rate of binding.

Aspect 6: The method of aspect 5, wherein the step of determining the property of the analyte in the sample is based on the measurement signal before and during the debinding step and during the binding step.

Aspect 7: The method of aspect 5 or aspect 6, wherein the method comprises alternating plural binding steps and plural debinding steps; and wherein the method comprises obtaining the measurement signal during the plural debinding step and binding steps.

Aspect 8: The method of any preceding aspect, wherein the step of determining the property of the analyte is based on a rate of change in the measurement signal during at least one of the binding and/or debinding steps.

Aspect 9: A system for determining a property of an analyte in a sample, the system comprising: a sensor assembly, the sensor assembly comprising a sensing element comprising a sensing surface and capture species configured to specifically bind with the analyte provided on the sensing surface, the sensing element providing a measurement signal indicative of the interaction of the capture species with the analyte; a field application unit configured to apply a field to the sensing surface so as to apply a force to the sample adjacent the sensing surface so as to cause at least a portion of specifically-bound analyte species to debind from the capture species; a control unit configured to operate the field application unit; and a property determination unit configured to determine the property of the analyte, wherein the control unit is configured to: operate the field application unit so as to apply a force to the sample and cause specifically-bound analyte species to debind from the capture species in a debinding step; and operate the field application unit so as to remove or modify the field so as to allow at least a portion of analyte specifically bind to capture species to form a specifically-bound analyte species in a binding step; wherein the property determination unit is configured to determining the property of the analyte in the sample based on the measurement signal before and during the debinding step and during and/or after the binding step.

Aspect 10: The system of aspect 9, wherein the field application unit is configured to generate an electric field and/or a magnetic field to provide the force.

Aspect 11: The system of aspect 10, wherein the field application unit comprises a plurality of electrodes configured to apply an electric field about the sensing element.

Aspect 12: The system of any of aspect 9 to 11, wherein the control unit is further configured to operate the field application unit to apply a field to sample on the sensing surface to increase the rate of binding of analyte to the capture species in the binding step.

Aspect 13: The system of aspect 12, wherein the field application unit is configured to apply a directional field and wherein the control unit is configured to operate the field application unit to apply a field to sample on the sensing surface to increase the rate of binding of analyte to the capture species in the binding step by applying a field which causes the analyte to move towards the sensing surface.

Aspect 14: The system of any of aspect 9 to 13, wherein the property determination unit is configured to determine the property of the analyte in the sample based on the measurement signal before and during the debinding step and during the binding step.

Aspect 15: The system of any of aspect 9 to 14, wherein the control unit is configured to alternate plural binding steps and plural debinding steps; and wherein the property determination unit is configured to determine the property of the analyte in the sample based on the measurement signal during the plural debinding step and binding steps.

Aspect 16: The system of any of aspects 9 to 15, wherein the property determination unit is configured to determine the property of the analyte based on a rate of change in the measurement signal during at least one of the binding step and/or debinding step.

Aspect 17: The system of any of aspects 9 to 16, wherein the sensing element comprises a sensing layer, the sensing layer at least partly defining the sensing surface and having a plurality of structures formed therein; and wherein the measurement signal is dependent on the location of analyte relative to the plurality of structures in the sensing layer.

Aspect 18: The system of aspect 17, wherein the measurement signal is indicative of an impedimetric property of the sensing layer; and wherein the plurality of structures are arranged on or in the sensing layer such that an analyte received between or within the structures modifies the impedimetric property.

The invention claimed is:

1. A system for determining a property of an analyte in a sample, the system comprising:
  a sensor assembly, the sensor assembly comprising a sensing element comprising a sensing surface and capture species configured to specifically bind with the analyte provided on the sensing surface in a binding step to provide a first specifically-bound analyte species, the sensing element providing a measurement signal indicative of an interaction of the capture species with the analyte;

a field application unit configured to apply a field to the sensing surface so as to apply a force to the sample adjacent the sensing surface so as to cause at least a portion of the first specifically-bound analyte species to debind from the capture species in a debinding step, thus providing unbound analyte and unbound capture species;

a control unit configured to operate the field application unit; and a property determination unit configured to determine the property of the analyte, wherein the control unit is configured to:

operate the field application unit so as to apply the force to the sample and cause the first specifically-bound analyte species to debind from the capture species; and operate the field application unit so as to remove or modify the field so as to allow at least a portion of the unbound analyte to specifically re-bind to at least a portion of the unbound capture species to form a second specifically-bound analyte species in a re-binding step;

wherein the property determination unit is configured to determine the property of the analyte in the sample based on a plurality of measurement signals comprising:

(a) a first measurement signal indicative of an interaction of the capture species with the analyte in the first specifically-bound analyte species before the debinding step, (b) a second measurement signal indicative of an interaction of the capture species with the analyte during the debinding step, and (c) at least one of a third measurement signal indicative of an interaction of the unbound capture species with the unbound analyte during the re-binding step and a fourth measurement signal indicative of an interaction of the capture species and the analyte in the second specifically-bound analyte species after the re-binding step.

2. The system of claim 1, wherein the field application unit is configured to generate an electric field and/or a magnetic field to provide the force.

3. The system of claim 2, wherein the field application unit comprises a plurality of electrodes configured to apply the electric field about the sensing element.

4. The system of claim 1, wherein the control unit is further configured to operate the field application unit to apply a field to the sample on the sensing surface to increase a rate of binding of the unbound analyte to the unbound capture species in the re-binding step.

5. The system of claim 1, wherein the field application unit is configured to apply a directional field and wherein the control unit is configured to operate the field application unit to apply the directional field to the sample on the sensing surface to increase a rate of binding of the unbound analyte to the unbound capture species in the re-binding step causing the unbound analyte to move towards the sensing surface.

6. The system of claim 1, wherein the property determination unit is configured to determine the property of the analyte in the sample based on the first measurement signal, the second measurement signal, and the third measurement signal.

7. The system of claim 1, wherein the debinding step is one of a plurality of debinding steps and the re-binding step is one of a plurality of re-binding steps; wherein the control unit is configured to alternate the plurality of re-binding steps and the plurality of debinding steps; and wherein the property determination unit is configured to determine the property of the analyte in the sample based on measurement signals obtained during the plurality of debinding steps and the plurality of re-binding steps.

8. The system of claim 1, wherein the property determination unit is configured to determine the property of the analyte based on a rate of change in the plurality of measurement signals.

9. The system of claim 1, wherein the sensing element comprises a sensing layer, the sensing layer at least partly defining the sensing surface and having a plurality of structures formed therein; and wherein the plurality of measurement signals are dependent on a location of the analyte relative to the plurality of structures in the sensing layer.

10. The system of claim 9, wherein the plurality of measurement signals are indicative of an impedimetric property of the sensing layer; and wherein the plurality of structures are arranged on or in the sensing layer such that the analyte received between or within the plurality of structures modifies the impedimetric property.

* * * * *